US010421510B2

(12) United States Patent
Aramayo, II et al.

(10) Patent No.: US 10,421,510 B2
(45) Date of Patent: Sep. 24, 2019

(54) THREE-LEGGED ROBOTIC APPARATUS

(71) Applicant: Sphero, Inc., Boulder, CO (US)

(72) Inventors: Gustavo Augusto Aramayo, II, Arvada, CO (US); David Clarke, Lafayette, CO (US); Ross MacGregor, Erie, CO (US); Judd Nutting, Boulder, CO (US)

(73) Assignee: SPHERO, INC., Boulder, CO (US)

( * ) Notice: Subject to any disclaimer, the term of this patent is extended or adjusted under 35 U.S.C. 154(b) by 87 days.

(21) Appl. No.: 15/659,169

(22) Filed: Jul. 25, 2017

(65) Prior Publication Data

US 2019/0031259 A1 Jan. 31, 2019

(51) Int. Cl.
*B62D 57/032* (2006.01)
*B62D 57/028* (2006.01)
*B62D 57/02* (2006.01)
*A63H 11/10* (2006.01)

(52) U.S. Cl.
CPC ........... *B62D 57/032* (2013.01); *A63H 11/10* (2013.01); *B62D 57/022* (2013.01); *B62D 57/028* (2013.01); *A63H 2200/00* (2013.01)

(58) Field of Classification Search
CPC .. B62D 57/032; B62D 57/022; B62D 57/028; B62D 57/02

See application file for complete search history.

(56) References Cited

U.S. PATENT DOCUMENTS

| | | | | |
|---|---|---|---|---|
| 5,151,859 A * | 9/1992 | Yoshino | ............... | B62D 57/032 180/8.6 |
| 5,357,433 A * | 10/1994 | Takenaka | ............. | B62D 57/032 180/8.1 |
| 5,369,346 A * | 11/1994 | Takahashi | ............ | B62D 57/032 180/8.1 |
| 5,445,235 A * | 8/1995 | Gomi | ................... | B25J 19/0075 180/8.1 |
| 5,872,893 A * | 2/1999 | Takenaka | ............. | B62D 57/032 180/8.6 |
| 6,876,903 B2 * | 4/2005 | Takenaka | ............. | B62D 57/032 318/568.15 |
| 7,099,743 B2 * | 8/2006 | Lee | ........................ | B25J 9/1065 318/568.1 |
| 7,143,850 B2 * | 12/2006 | Takenaka | ............. | B25J 19/0012 180/8.6 |
| 7,278,501 B2 * | 10/2007 | Mori | ...................... | B25J 9/1641 180/8.5 |

(Continued)

*Primary Examiner* — Joseph M Rocca
*Assistant Examiner* — Michael R Stabley

(57) ABSTRACT

A robotic apparatus moveable between a bipod mode and a tripod mode includes a housing, a first leg and a second leg extending from the housing, and a retractable third leg positioned between the first leg and the second leg. The third leg is configured to extend from the housing in the tripod mode and retract at least partially into the housing in the bipod mode. The robotic apparatus also includes a motor disposed within the housing and a transmission system coupled between the motor and at least one of the first leg, the second leg, and the third leg. The transmission system is configured to move the robotic apparatus between the bipod mode where the first leg and the second leg support the housing and the tripod mode where the first leg, the second leg, and the third leg support the housing.

34 Claims, 19 Drawing Sheets

(56) References Cited

U.S. PATENT DOCUMENTS

| | | | | |
|---|---|---|---|---|
| 7,561,941 | B2* | 7/2009 | Kwon | A63H 11/00 180/8.2 |
| 7,598,695 | B2* | 10/2009 | Takanishi | B25J 9/1065 318/14 |
| 8,457,830 | B2* | 6/2013 | Goulding | B62D 57/024 701/26 |
| 8,630,763 | B2* | 1/2014 | Goulding | B62D 57/024 701/26 |
| 9,089,968 | B2* | 7/2015 | Goulding | B62D 57/024 |
| 2005/0021180 | A1* | 1/2005 | Kwon | A63H 11/00 700/245 |
| 2016/0185405 | A1* | 6/2016 | Takanishi | B62D 57/032 180/8.3 |

* cited by examiner

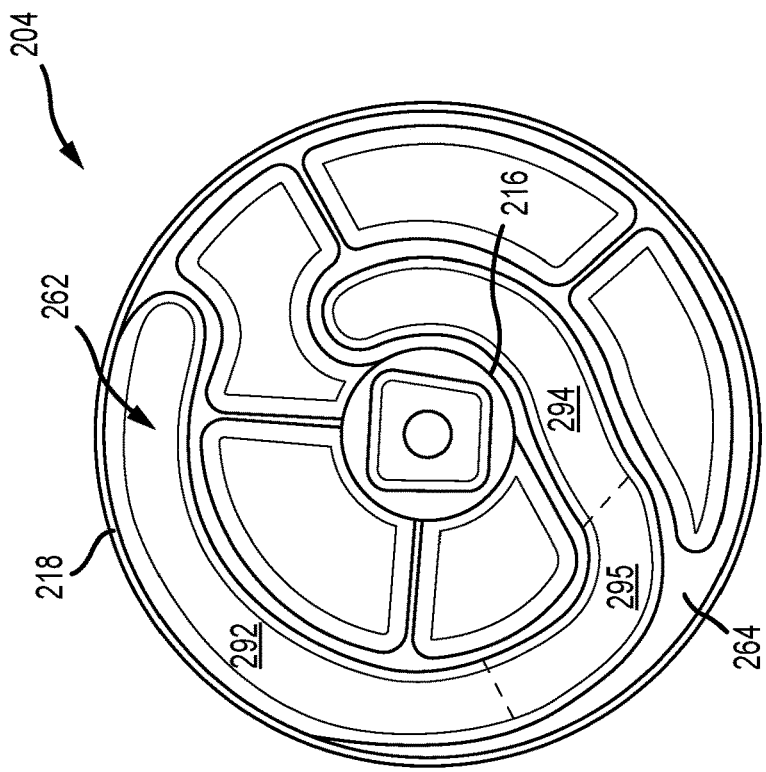
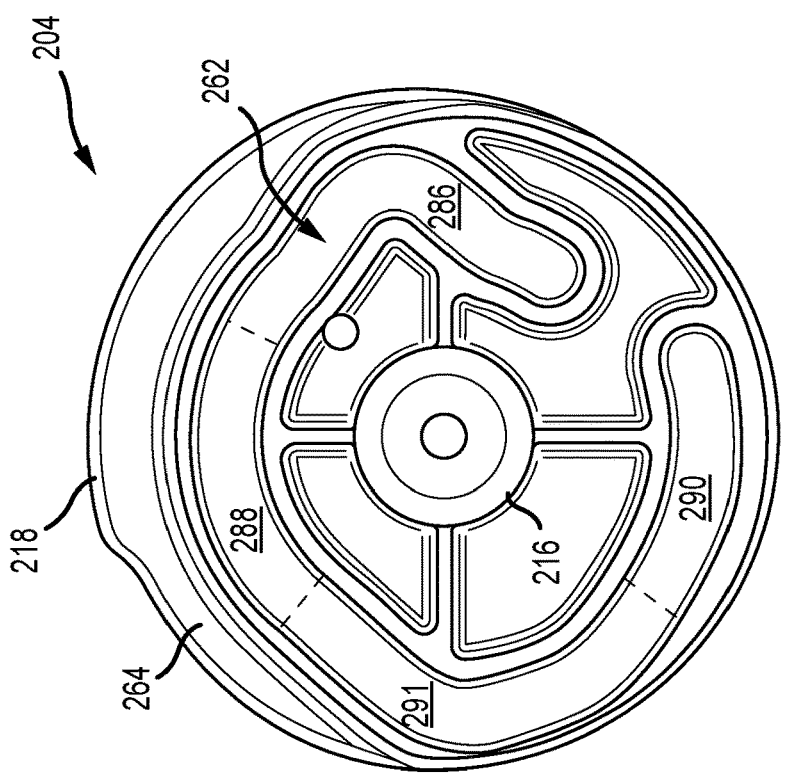

THREE-LEGGED ROBOTIC APPARATUS

INTRODUCTION

Robotic remote controlled apparatuses typically use electric motors to engage one or more components of the apparatus in order to cause the apparatus to change configurations and/or drive along a surface. Accordingly, a number of components are often required to move in concert during operation of the robotic apparatus.

SUMMARY

In one aspect, the technology relates to a robotic apparatus moveable between a bipod mode and a tripod mode, the apparatus including: a housing; a first leg and a second leg extending from the housing; a retractable third leg positioned between the first leg and the second leg, wherein the third leg is configured to extend from the housing in the tripod mode and retract at least partially into the housing in the bipod mode; a motor disposed within the housing; and a transmission system coupled between the motor and at least one of the first leg, the second leg, and the third leg, wherein the transmission system is configured to move the robotic apparatus between the bipod mode where the first leg and the second leg support the housing and the tripod mode where the first leg, the second leg, and the third leg support the housing.

In an example, the first leg and the second leg pivot relative to the housing when the robotic apparatus moves from the bipod mode to the tripod mode. In another example, when the robotic apparatus moves from the bipod mode to the tripod mode, the third leg extends from the housing. In yet another example, a first foot is disposed at an end of the first leg, wherein the first foot is pivotable relative to the first leg; and a second foot is disposed at an end of the second leg, wherein the second foot is pivotable relative to the second leg. In still another example, the first foot is configured to pivot off-cycle from the second foot. In an example, when the robotic apparatus moves between the bipod mode and the tripod mode, the first foot and the second foot substantially simultaneously pivot relative to the first leg and the second leg respectively.

In another example, the first foot and the second foot are configured to drive the robotic apparatus along a surface. In yet another example, the transmission system includes a cam system, wherein the cam system is configured to move the first leg, the second leg, and the third leg relative to the housing. In still another example, the cam system includes at least one cam rotatable about a cam axis. In an example, a shoulder assembly extends between the first leg and the second leg, wherein the cam system is coupled to the shoulder assembly, and wherein the cam system includes a profile configured to pivot the shoulder assembly about a leg pivot axis such that the first leg and the second leg pivot relative to the housing. In another example, the leg pivot axis and the cam axis are offset.

In yet another example, the cam system includes at least one profile configured to pivot the first foot and the second foot relative to the first leg and the second leg respectively. In still another example, the at least one profile is further configured to pivot the first foot off-cycle from the second foot when in the bipod mode. In an example, the at least one profile is further configured to substantially simultaneously pivot the first foot and the second foot relative to the first leg and the second leg respectively when the first leg and the second leg pivot relative to the housing. In another example, the cam system includes a profile configured to actuate the third leg. In yet another example, the profile is further configured to substantially simultaneously extend the third leg when the first leg and the second leg pivot relative to the housing.

In still another example, a linkage is coupled between the cam system and the third leg, wherein the linkage is configured to translate rotational movement of the cam into linear movement of the third leg. In an example, the robotic apparatus further includes a lockout mechanism, wherein the cam system includes a profile configured to extend the lockout mechanism, wherein the lockout mechanism is configured to prevent retraction of the third leg into the housing when the robotic apparatus is in the tripod mode. In another example, the lockout mechanism is disposed within the housing. In yet another example, the housing includes a stop, and wherein the cam system is configured to extend the third leg such that a portion of the third leg engages the stop with a predetermined force. In still another example, the first foot and the second foot each include a drive motor and a belt drive, wherein the drive motor is configured to rotate the belt drive to drive the robotic apparatus along a surface.

In an example, the cam system is configured to pivot the first foot and the second foot relative to the first leg and the second leg respectively such that a ground engaging surface of the belt drive is substantially parallel to the surface when the robotic apparatus is in the bipod mode and in the tripod mode. In another example, the third leg includes a third foot, the third foot including a skid.

In another aspect, the technology relates to a method of moving a robotic apparatus from a bipod mode to a tripod mode, the robotic apparatus including a housing, a first leg and a second leg extending from the housing, and a retractable third leg positioned between the first leg and the second leg, the method includes: driving a transmission system by a motor; pivoting the first leg and the second leg with respect to the housing via the transmission system; and extending the third leg from the housing via the transmission system, wherein in the bipod mode the first leg and the second leg support the housing and the third leg is at least partially retracted into the housing, and wherein in the tripod mode the first leg, the second leg, and the third leg support the housing and the third leg is at least partially extended out of the housing.

In an example, when the first leg and the second leg pivot, the third leg substantially simultaneously extends from the housing when the robotic apparatus moves from the bipod mode to the tripod mode. In another example, the robotic apparatus further includes a first foot disposed at an end of the first leg and a second foot disposed at an end of the second leg, the method further includes: pivoting the first foot relative to the first leg; and pivoting the second foot relative to the second leg. In yet another example, when the first leg and the second leg pivots, the first foot and the second foot substantially simultaneously pivot relative to the first leg and the second leg respectively when the robotic apparatus moves from the bipod mode to the tripod mode. In still another example, the method further includes driving the robotic apparatus along a surface via the first foot and the second foot. In an example, the first foot and the second foot each include a drive motor and a belt drive, and wherein driving the robotic apparatus includes rotating the belt drive via the drive motor.

In another example, the transmission system includes a cam system having at least one cam, and wherein driving the transmission system includes rotating the at least one cam about a cam axis. In yet another example, the robotic apparatus further includes a shoulder assembly coupled between the cam system and the first leg and the second leg, and wherein pivoting the first leg and the second leg includes pivoting the shoulder assembly about a leg pivot axis via the at least one cam. In still another example, the third leg includes a linkage coupled to the cam system, and wherein extending the third leg includes translating rotational movement of the at least one cam into linear movement of the third leg via the linkage. In an example, the robotic apparatus further includes a lockout mechanism coupled to the cam system, and wherein extending the third leg includes extending the lockout mechanism such that the third leg is prevented from retracting into the housing when the robotic apparatus is in the tripod mode. In another example, the housing includes a stop, and wherein extending the third leg comprises engaging, with a predetermined force, the stop with a portion of the third leg.

In another aspect, the technology relates to a robotic apparatus includes: a housing; a first leg and a second leg extending from the housing; a retractable third leg positioned between the first leg and the second leg; and means for moving the robotic apparatus between a bipod mode and a tripod mode, wherein the first leg and the second leg support the housing in the bipod mode and the first leg, the second leg, and the third leg support the housing in the tripod mode. In an example, the first leg includes a first foot and the second leg includes a second foot, and wherein the first foot and the second foot each include means for driving the robotic apparatus along a surface.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIGS. 6A and 6B are opposite side views of a left cam of the cam system of FIG. 3.

DETAILED DESCRIPTION

The robotic apparatus described herein can move between a bipod mode and a tripod mode, generate a shuffling mode while in the bipod mode, and drive the apparatus along a surface. A transmission system disposed within the apparatus enables a right and left leg to move substantially simultaneously with each other and also pivot right and left feet relative to the legs. Moreover, a mid-leg is positioned between the right and left legs and is extended/retracted from the robotic apparatus while the right and left legs pivot between the bipod mode and the tripod mode. By moving the right and left legs, right and left feet, and the mid-leg in concert, the robotic apparatus has a smooth transition between the bipod mode and tripod mode and the transition may occur while driving the apparatus along the surface. In the depicted figures a decorative and/or protective outer housing of the robotic apparatus is not depicted for clarity.

Figure 1A:
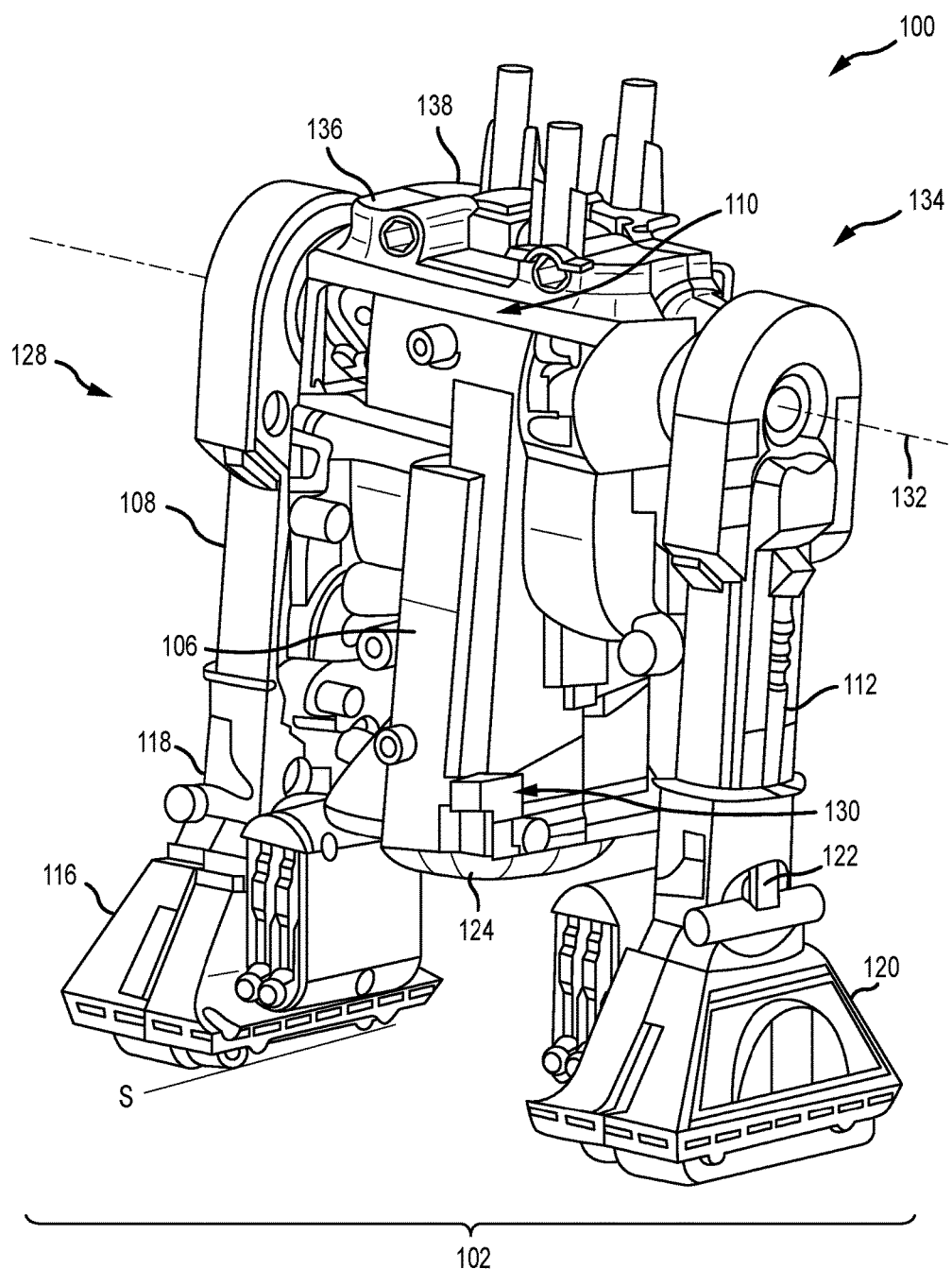
FIGS. 1A and 1B are front perspective views of a robotic apparatus in a bipod mode and a tripod mode respectively.
Figure 1B:
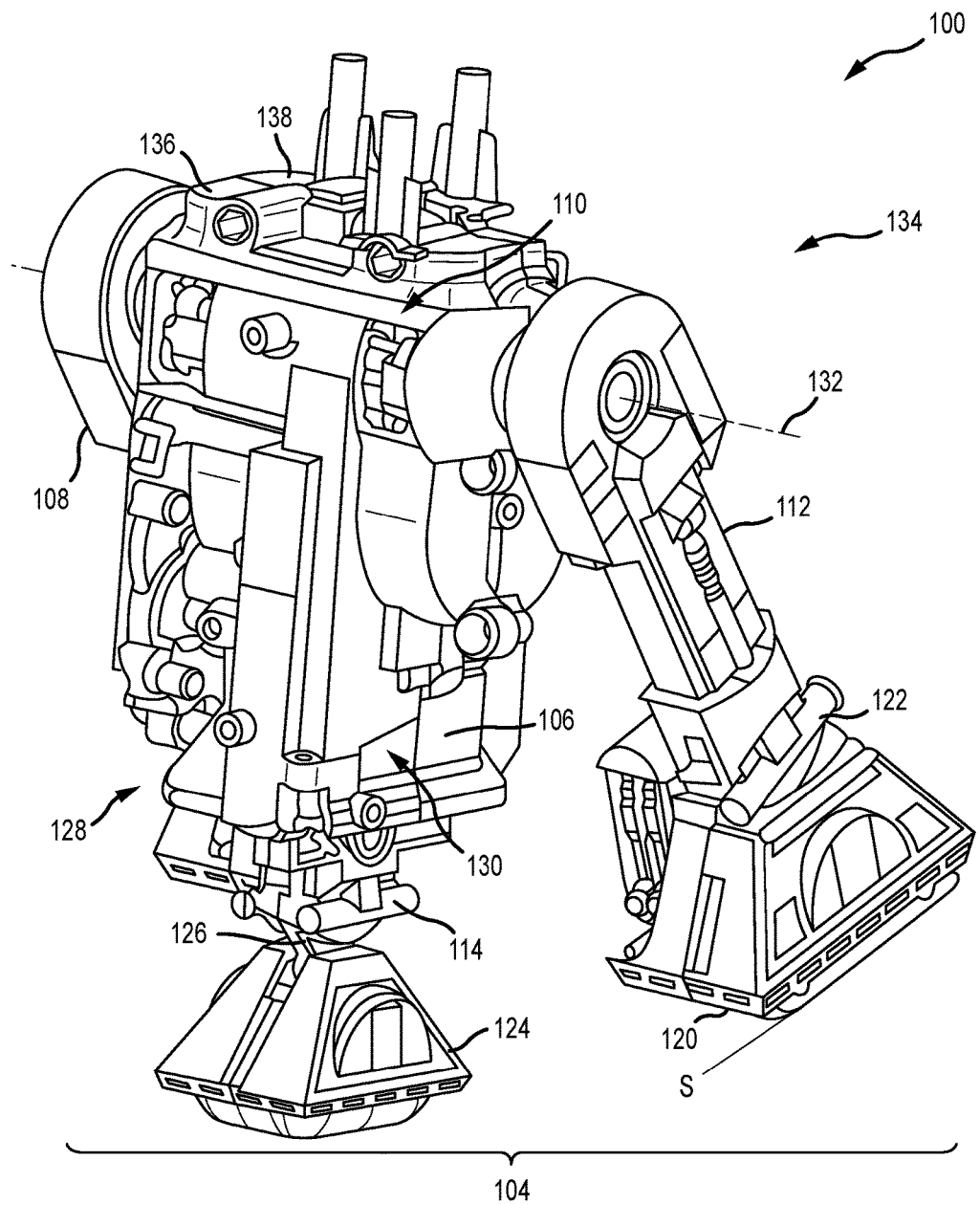

FIGS. 1A and 1B are front perspective views of a robotic apparatus 100 in a bipod mode 102 and a tripod mode 104 respectively. Referring concurrently to FIGS. 1A and 1B, the robotic apparatus 100 includes a housing 106, a first or right leg 108 extending from a top section 110 of the housing 106, and an opposite second or left leg 112 extending from the top section 110 of the housing 106. A retractable third or mid-leg 114 is positioned between the right leg 108 and the left leg 112. A first or right foot 116 is disposed at an end 118 of the right leg 108 and a second or left foot 120 is disposed at an end 122 of the left leg 112. Additionally, a third or mid-foot 124 is disposed at an end 126 of the mid-leg 114. In the example, the terms "right" and "left" are orientations of the components with respect to looking in the same direction as a front face 128 of the robotic apparatus 100.

In operation, the robotic apparatus 100 is configured to drive along a surface S (e.g., carpeted floor, hardwood floor, desktop, concrete, etc.). Additionally, before, after, and/or during the driving movement, the robotic apparatus 100 may be moved between the bipod mode 102 and the tripod mode 104, which allows for greater stability during the driving movement. In the bipod mode 102, the mid-leg 114 and mid-foot 124 are retracted at least partially into the housing 106 such that only the right leg 108 and foot 116 and the left leg 112 and foot 120 are supporting the robotic apparatus 100 on the surface S, as illustrated in FIG. 1A. In the tripod mode 104, the mid-leg 114 is extended from a lower section 130 of the housing 106 such that the mid-foot 124 is extended to the surface S, as illustrated in FIG. 1B. The right leg 108 and foot 116, the left leg 112 and foot 120, and the mid-leg 114 and foot 124 support the robotic apparatus 100 while the housing 106 is disposed at an angle in the tripod mode 104.

When the robotic apparatus 100 moves from the bipod mode 102 to the tripod mode 104, both the right leg 108 and the left leg 112 pivot relative to the housing 106 so that a portion of the housing 106 is positioned forward of the legs 108, 112. Additionally, a longitudinal axis of the mid-leg 114 is disposed at an angle to a longitudinal axis of the right and left legs 108, 112. The right leg 108 pivots about a leg pivot axis 132 along with the left leg 112 at the top section 110 of the housing 106. The right leg 108 and the left leg 112 pivot about the pivot axis 132 such that the right and left leg ends 118, 122 rotate towards a rear face 134 of the robotic apparatus 100 and away from the housing 106 at a distance corresponding to the angular pivot of the legs 108, 112.

Additionally, the right and left feet 116, 120 are positioned behind the rear face 134. In the example, the right leg 108 and the left leg 112 move substantially simultaneously with each other. In alternative examples, the right leg 108 may move independently from the left leg 112.

As the right and left legs 108, 112 pivot relative to the housing 106, the right and left feet 116, 120 also pivot relative to the legs 108, 112 so that the feet 116, 120 remain substantially parallel to the surface S and which the robotic apparatus stands. The right foot 116 is pivotable relative to the right leg end 118 and the left foot 120 is pivotable relative to the left leg end 122 about a pivot axis 424 (shown in FIG. 4B). When the right 118 and left leg ends 122 move circumferentially upon pivoting of the right and left legs 108, 112, the right and left feet 116, 120 pivot towards the front of the legs 108, 112 at an angle that corresponds the distance the legs 108, 112 travel. In the example, the right foot 116 moves substantially simultaneously with the right leg 108 and the left foot 120 moves substantially simultaneously with the left leg 112.

Additionally, when the robotic apparatus 100 is in the bipod mode 102, the right foot 116 is configure to pivot off-cycle from the left foot 120. More specifically, if the right foot 116 pivots towards the front of the right leg 108 then the left foot 120 pivots the opposite direction and towards the back of the left leg 112 and vice-versa. By cycling the pivot direction of the right and left feet 116, 120 while in the bipod mode 102, the robotic apparatus 100 may visually demonstrate a shuffling motion while positioned on the surface S. The off-cycle pivoting of the right and left feet 116, 120 is described in further detail below with reference to FIGS. 4E and 4F.

Furthermore, when the robotic apparatus 100 moves from the bipod mode 102 to the tripod mode 104, the mid-leg 114 extends out from a retracted position from within the lower section 130 of the housing 106. In the bipod mode 102, the mid-leg 114 is retracted at least partially within the housing 106. To enter the tripod mode 104, the mid-leg 114 linearly extends outward from an opening defining in the lower section 130 so that the mid-foot 124 reaches the surface S. In the example, the mid-leg 114 can be formed from a plurality of components as described further below. As the mid-leg 114 extends towards and contacts the surface S, the mid-foot 124 can pivot so as to become parallel to the surface S. In FIG. 1B, this pivot of the mid-foot 124 is not depicted. In the example, the mid-leg 114 substantially simultaneously extends/retracts from the housing 106 as the right and left legs 108, 112 angularly pivot. In alternative examples, the mid-leg 114 may move independently from the right and left legs 108. The housing 106 may include a front portion 136 and a back portion 138 that defines an interior cavity 140 (shown in FIGS. 2A and 2B) in which the components that drive the robotic apparatus 100 between the bipod mode 102 and the tripod mode 104 are housed. These drive components are described further below.

Figure 2A:
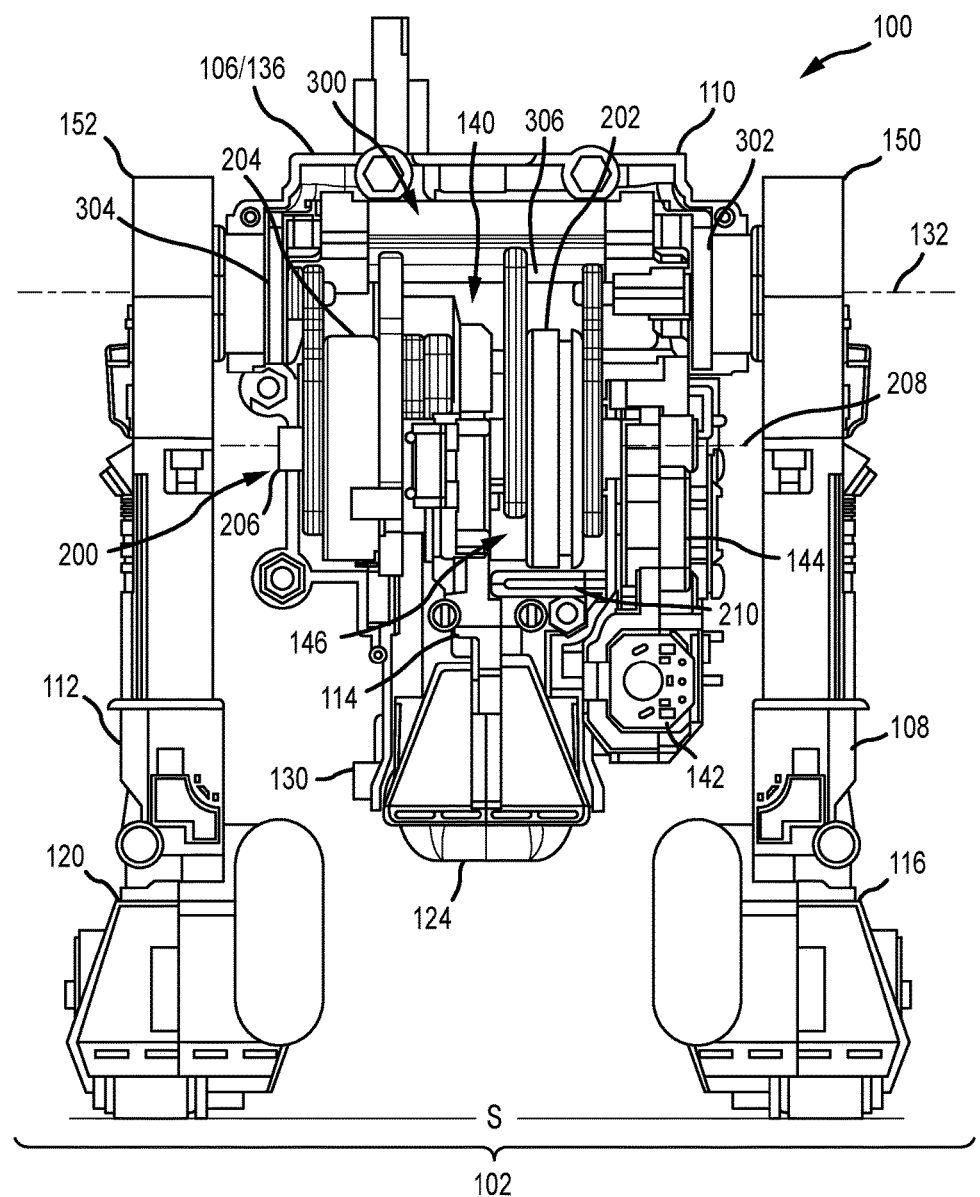
FIGS. 2A and 2B are internal rear views of the robotic apparatus in the bipod mode and the tripod mode respectively.
Figure 2B:
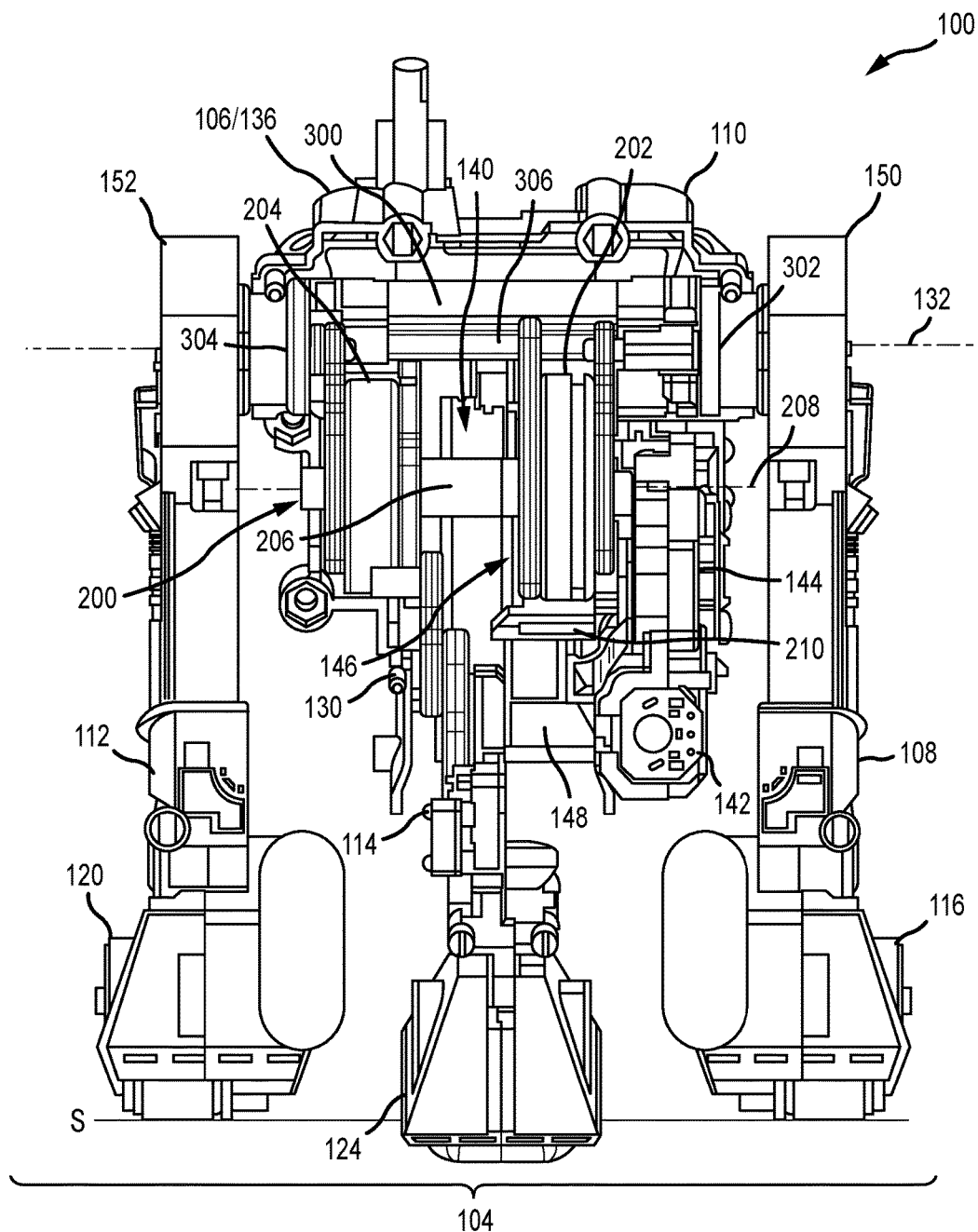

FIGS. 2A and 2B are internal rear views of the robotic apparatus 100 in the bipod mode 102 and the tripod mode 104 respectively. Referring concurrently to FIGS. 2A and 2B, the housing 106 has the back portion 138 (shown in FIGS. 1A and 1B) removed so as to illustrate the drive components that are housed within the interior cavity 140 and which drive the robotic apparatus 100 between the bipod mode 102 and the tripod mode 104. The housing 106 can include one or more channels formed within the interior cavity 140 to facilitate positioning and movement of the drive components as described below. The robotic apparatus 100 includes an electric motor 142 that is used to move the right leg 108, the left leg 112, and the mid-leg 114, and pivot the right foot 116 and the left foot 120 between the bipod mode 102 and the tripod mode 104 and is disposed in the right side of the housing 106. The motor 142 is coupled to a gearbox 144 and a transmission system 146 to enable movement of the legs 108, 112, and 114. The gearbox 144, for example, may include one or more gear reductions that are connected to a drive gear that is coupled to and directly drives the transmission system 146. Additionally, the gearbox 144 may include a position gear that is used to record the angular position of the drive gear. In alternative examples, encoders or other like positional recording elements may be used. The transmission system 146 is coupled to the right leg 108, the left leg 112, and the mid-leg 114 and may be driven by the motor 142 through the gearbox 144 to facilitate the movement of the legs 108, 112, and 114 between the bipod mode 102 and the tripod mode 104 as described above.

The lower section 130 of the housing 106 includes a stop 148 that forms a portion of a bottom surface of the housing 106. The stop 148 is positioned within the housing 106 so as to engage with a stop surface 540 (shown in FIG. 7) of the mid-leg 114 when the mid-leg 114 is in the tripod mode 104. As the mid-leg 114 extends out of the housing 106, the mid-leg 114 contacts and engages with the stop 148 with a predetermined force so that the mid-leg 114 remains in the extended tripod mode position without retracting back into the housing 106 under the weight of the robotic apparatus 100.

In the example, the transmission system 146 includes a cam system 200 that includes a right cam 202 and a left cam 204 fixed about a cam shaft 206 rotatably supported within the housing 106. The cam shaft 206 is coupled to the gearbox 144 such that the right and left cams 202, 204 are rotated about a cam axis 208 to move the right leg 108, the left leg 112, and the mid-leg 114 simultaneously relative to the housing 106. The cam system 200 also includes a lockout mechanism 210 that is slidingly coupled within the housing 106. The lockout mechanism 210 is coupled to the right cam 202 such that upon rotation of the cam 202 the lockout mechanism 210 linearly slides and extends from an unblocking position (illustrated in FIG. 2A) to a blocking position (illustrated in FIG. 2B) within the housing 106. In the blocking position, the lockout mechanism 210 prevents retraction of the mid-leg 114 into the housing 106 when the robotic apparatus 100 is in the tripod mode 104. Accordingly, the robotic apparatus 100 has redundant systems, the stop 148 and the lockout mechanism 210, for restricting undesirable retraction of the mid-leg 114 when in the tripod mode 104. The cam system 200 is also coupled to both the right and left feet 116, 120, so that as the right and left legs 108, 112 pivot the feet 116, 120 also simultaneously pivot as described further below.

The transmission system 146 can also include a shoulder assembly 300 that is positioned above and coupled to the cam system 200, and along the leg pivot axis 132. The shoulder assembly 300 extends between and is fixedly coupled to the right leg 108 and the left leg 112, and includes a right shoulder 302 and an opposite left shoulder 304 that are connected via one or more cross-bars 306. The right shoulder 302 is fixed to a top section 150 of the right leg 108 and the left shoulder 304 is fixed to a top section 152 of the left leg 112. The right and left shoulders 302, 304 are journaled within the top section 110 of the housing 106 about the pivot axis 132. Upon actuation of the cam system 200, the shoulder assembly 300 pivots with respect to the housing 106 about the pivot axis 132 so as to pivot the right and left legs 108, 112 such that they move between the bipod mode 102 and the tripod mode 104. In the example, the leg pivot axis 132 and the cam axis 208 are offset from one another.

Figure 3:
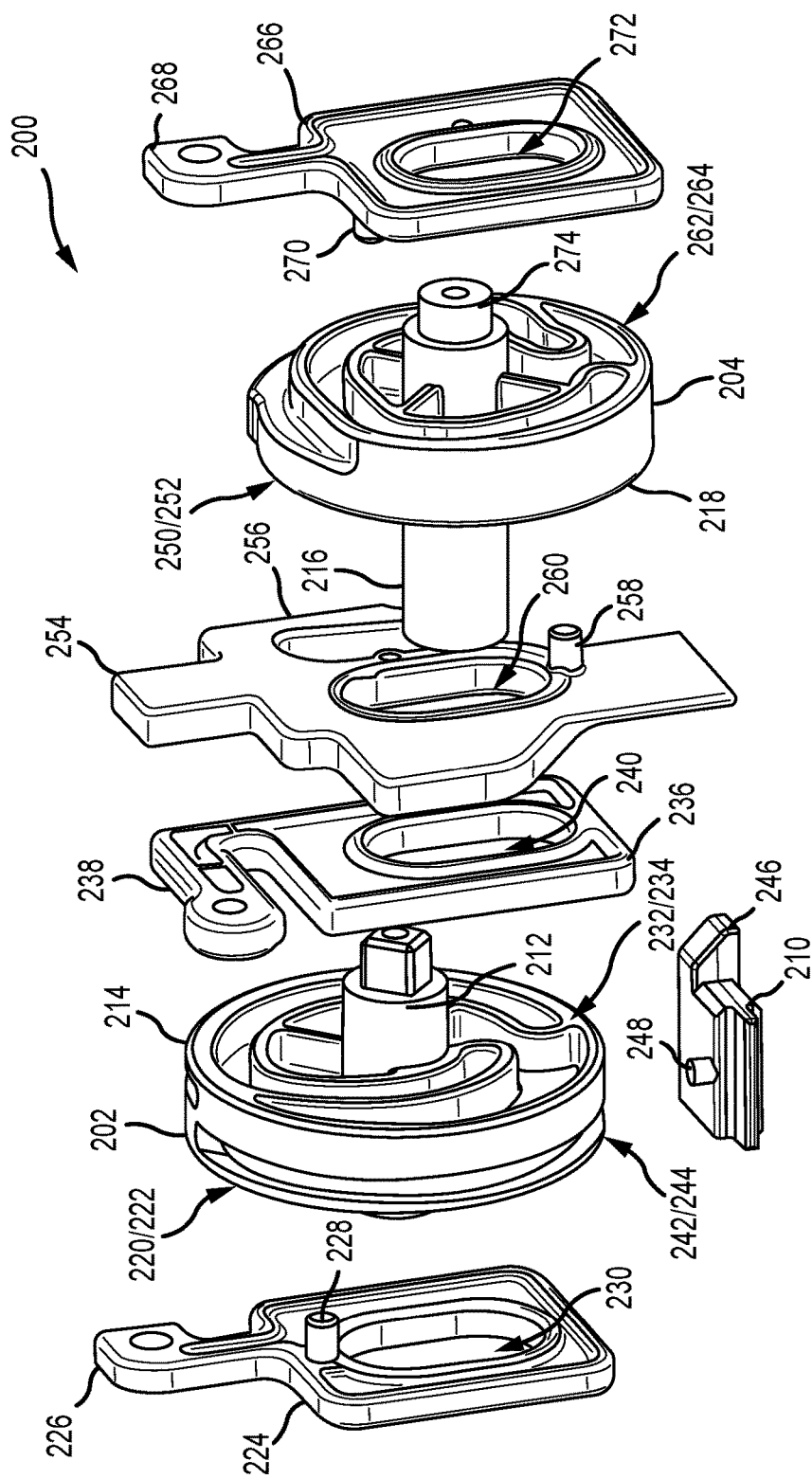
FIG. 3 is an exploded perspective view of a cam system of the robotic apparatus.

FIG. 3 is an exploded perspective view of the cam system 200 of the robotic apparatus. In the example, the right cam 202 includes a right cam shaft 212 that extends along the cam axis 208 (shown in FIGS. 2A and 2B) and a right cam disk 214 that is fixed about the shaft 212. The left cam 204 includes a left cam shaft 216 that extends along the cam axis 208 and a left cam disk 218 that is fixed about the shaft 216. The right cam shaft 212 may be coupled to the left cam shaft 216 forming the cam shaft 206 (shown in FIGS. 2A and 2B) so that rotation of the right cam shaft 212, via the motor, induces corresponding rotation of the left cam shaft 216.

A right foot cam profile 220 is formed on a first side 222 of the right cam disk 214. The profile 220 is a recessed track defined within the disk 214 and is shaped to transfer rotational movement of the right cam 202 into linear movement of a right foot follower 224, which in turn actuates the right foot. The right foot follower 224 includes a link arm 226 that is coupled to the right foot via a linkage, a follower pin 228 that rides through the profile 220, and an elongated opening 230 such that the follower 224 is positioned around the right cam shaft 212 and the follower 224 may linearly move in an up and down direction with respect to the shaft 212. The right foot follower 224 is sized and shaped to be disposed within the housing and slide therein so that rotation of the follower 224 is restricted and keeping movement of the flower 224 linear.

A shoulder cam profile 232 is formed on an opposite second side 234 of the right cam disk 214. The profile 232 is a recessed track defined within the disk 214 and is shaped to transfer rotational movement of the right cam 202 into linear movement of a shoulder follower 236, which in turn actuates the right and left legs. The shoulder follower 236 includes a link arm 238 that is coupled to the shoulder assembly, a follower pin (not shown) that rides through the profile 232, and an elongated opening 240 such that the follower 236 is positioned around the right cam shaft 212 and the follower 236 may linearly move in an up and down direction with respect to the shaft 212. The shoulder follower 236 is sized and shaped to be disposed within the housing and slide therein so that rotation of the follower 236 is restricted and keeping movement of the flower 236 linear.

Additionally, a lockout cam profile 242 is formed on a circumferential surface 244 of the right cam disk 214. The profile 242 is a recessed track defined within the disk 214 and is shaped to transfer rotational movement of the right cam 202 into linear movement of the lockout mechanism 210 in a direction along the cam axis, which in turn prevents retraction of the mid-leg into the housing when the robotic apparatus is in the tripod mode. The lockout mechanism 210 is sized and shaped to ride on one or more channels defined within the housing so that upon actuation by the lockout cam profile 242 movement is limited to a left-right sliding motion. The lockout mechanism 210 includes an extension 246 that extends into the retraction path of the mid-leg and a follower pin 248 that rides through the profile 242. In the example, the profile 242 has one end adjacent to the first side 222 of the disk 214 and the other end adjacent to the second side 234 such that the linear movement of the lockout mechanism 210 is approximately equal to the thickness of the disk 214.

A mid-leg cam profile 250 is formed on a first side 252 of the left cam disk 218. The profile 250 is a recessed track defined within the disk 218 and is shaped to transfer rotational movement of the left cam 204 into linear movement of a mid-leg follower 254, which in turn actuates the mid-leg. The mid-leg follower 254 includes a link arm 256 that is coupled to the mid-leg 114, a follower pin 258 that rides through the profile 250, and an elongated opening 260 such that the follower 254 is positioned around the left cam shaft 216 and the follower 254 may linearly move in an up and down direction with respect to the shaft 216. The mid-leg follower 254 is sized and shaped to be disposed within the housing and slide therein so that rotation of the follower 254 is restricted and keeping movement of the flower 254 linear.

Finally, a left foot cam profile 262 is formed on an opposite second side 264 of the left cam disk 218. The profile 262 is a recessed track defined within the disk 218 and is shaped to transfer rotational movement of the left cam 204 into linear movement of a left foot follower 266, which in turn actuates the left foot. The left foot follower 266 includes a link arm 268 that is coupled to the left foot via a linkage, a follower pin 270 that rides through the profile 262, and an elongated opening 272 such that the follower 266 is positioned around the left cam shaft 216 and the follower 266 may linearly move in an up and down direction with respect to the shaft 216. The left foot follower 266 is sized and shaped to be disposed within the housing and slide therein so that rotation of the follower 266 is restricted and keeping movement of the flower 266 linear.

The left cam shaft 216 also includes a bearing end 274 so that the cam shaft may be rotatably supported in the housing of the robotic apparatus. By rotating both the right 202 and left cams 204 at the same rotational speed, the right and left legs, the mid-leg, the right and left feet, and the lockout mechanism are all simultaneously actuated to as to move the robotic apparatus between the bipod mode and the tripod mode as described above. The shape and length of each cam profile 220, 232, 242, 250, 262 is configured to move the corresponding component in the desired distance given the same rotational movement. The cam profiles are described in further detail below with respect to FIGS. 5A-6B.

Figure 4A:
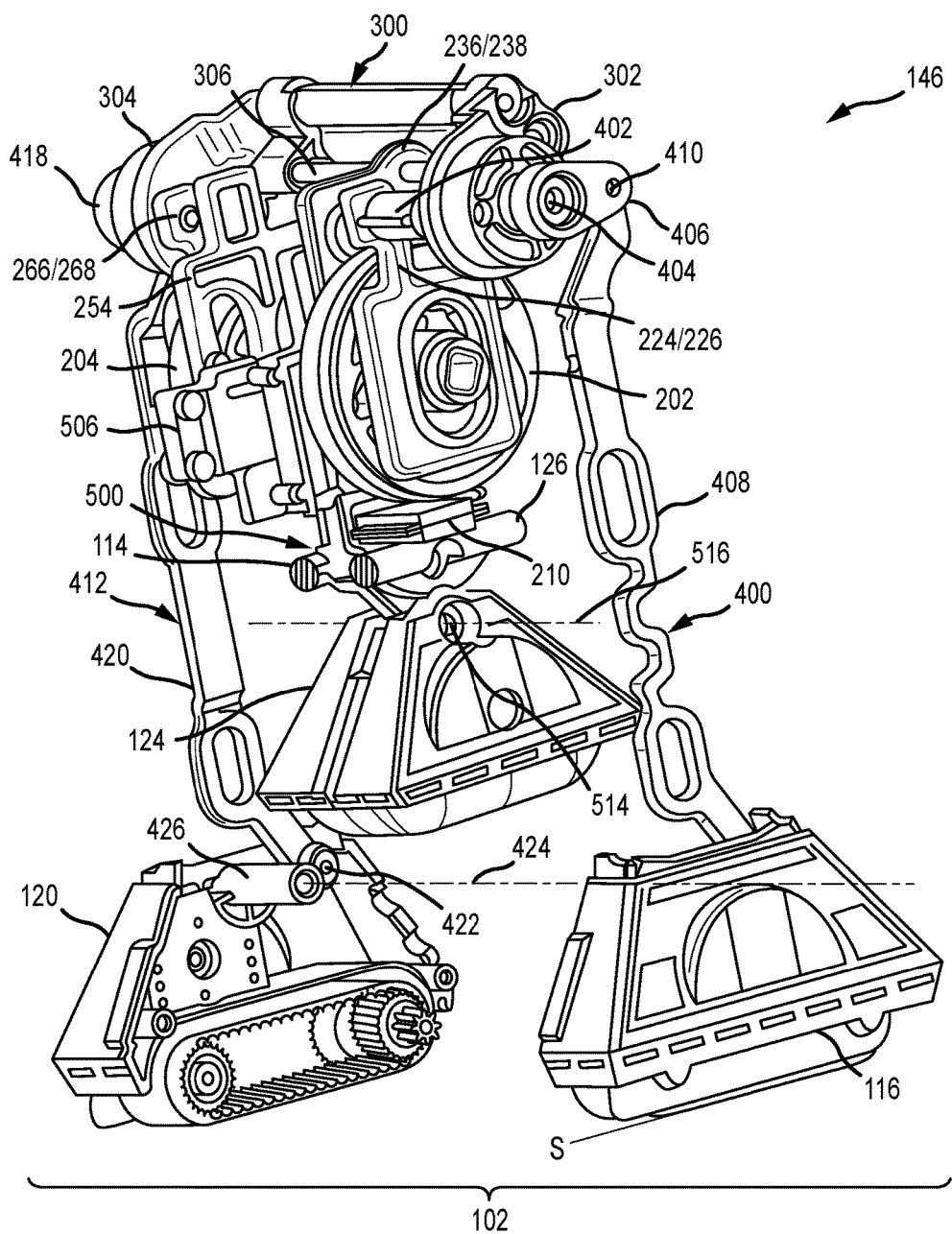
FIGS. 4A and 4B are rear perspective views of a transmission system of the robotic apparatus in the bipod mode and the tripod mode respectively.
Figure 4B:
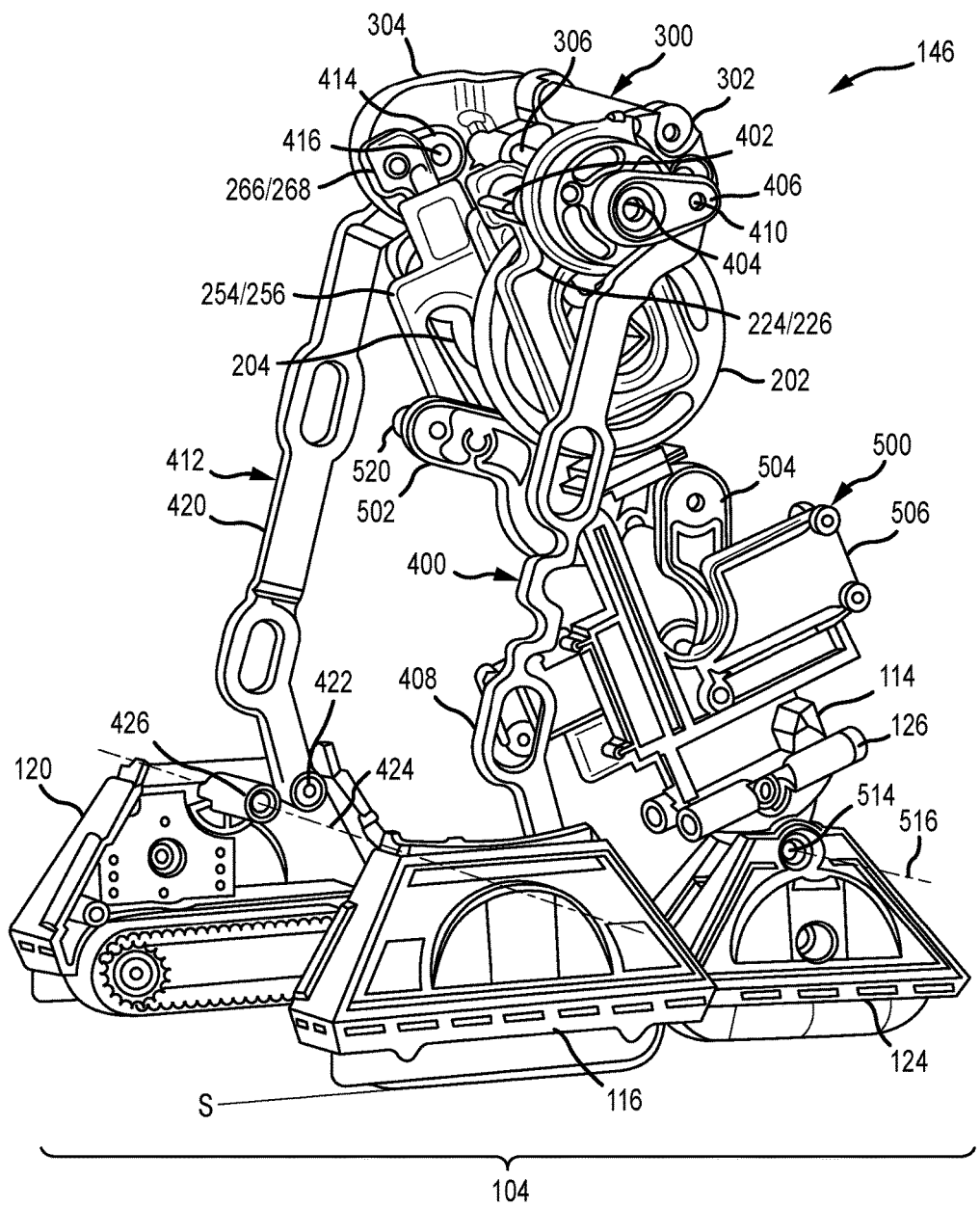
Figure 4C:
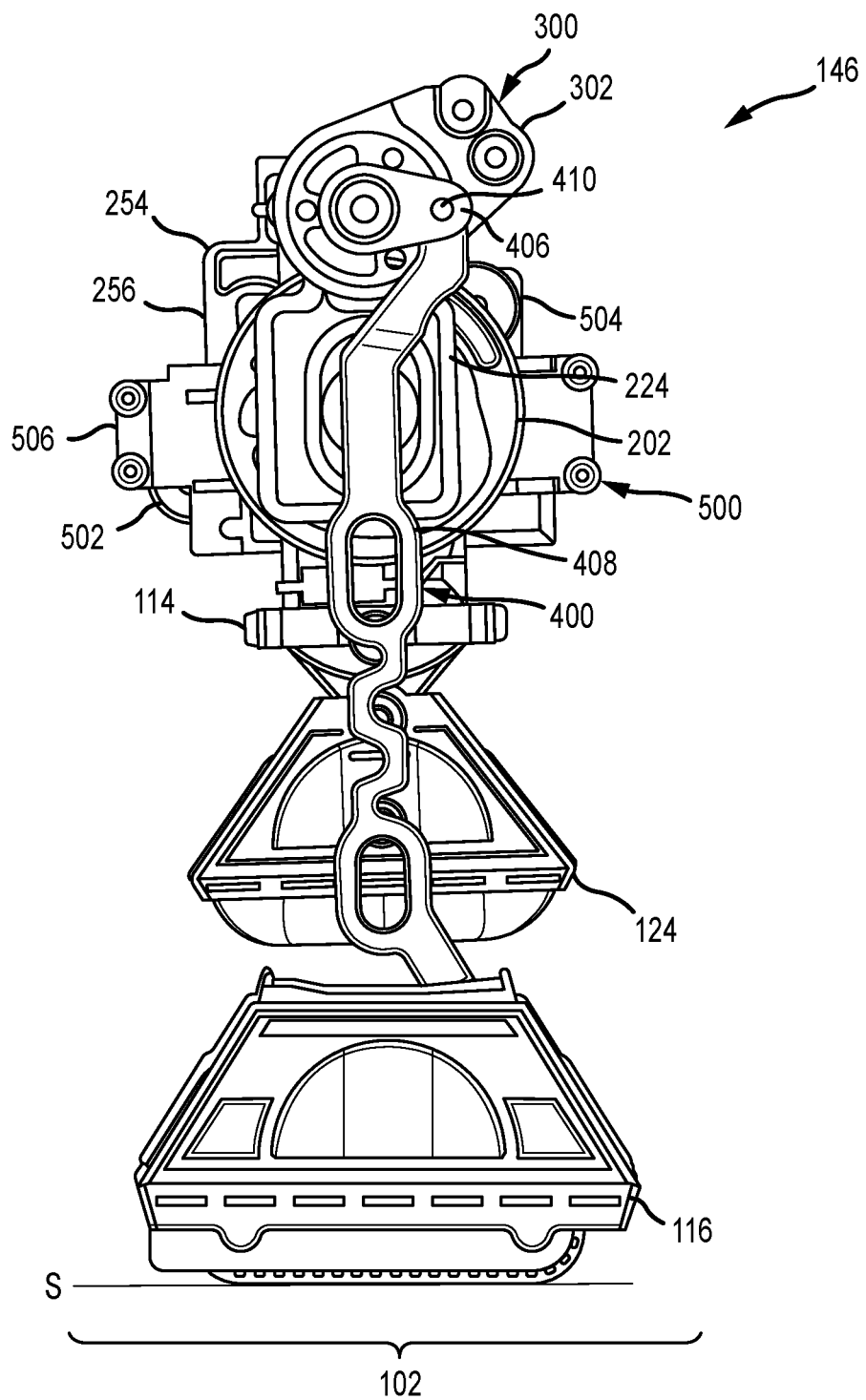
FIGS. 4C and 4D are side views of the transmission system of FIGS. 4A and 4B in the bipod mode and the tripod mode respectively.
Figure 4D:
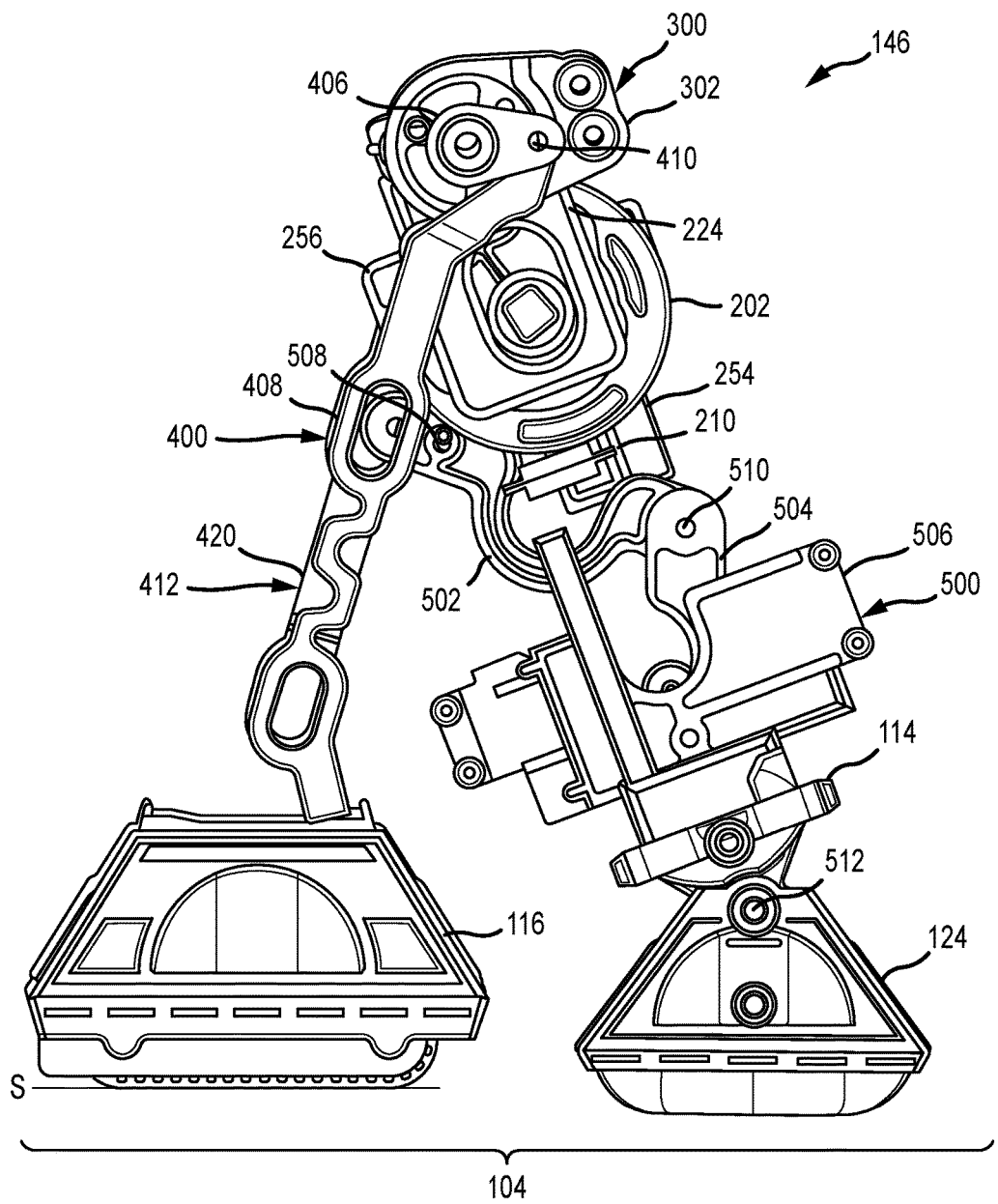

FIGS. 4A and 4B are rear perspective views of a transmission system 146 of the robotic apparatus in the bipod mode 102 and the tripod mode 104 respectively. FIGS. 4C and 4D are side views of the transmission system 146 in the bipod mode 102 and the tripod mode 104 respectively. Referring concurrently to FIGS. 4A-4D, the transmission system 146 translates movement generated by the electric motor into movement of the right and left legs, the mid-leg, and the right and left feet between the bipod mode 102 and the tripod mode 104.

The right and lefts legs are moved relative to the housing between the bipod mode 102 and the tripod mode 104 by actuating the shoulder assembly 300. The shoulder assembly 300 is actuated by the shoulder follower 236 which is connected to the cross-bar 306 at the link arm 238. Upon rotation of the right cam 202, the shoulder follower 236 is linearly displaced by the follower pin sliding through the shoulder cam profile. The displacement of the follower 236 induces rotational movement of the cross-bar 306 about the leg pivot axis. The cross-bar 306 is radially offset from the leg pivot axis so that the cam system 200 may be disposed below the shoulder assembly 300 within the housing. The rotational movement of the cross-bar 306 simultaneously pivots the right and left shoulders 302, 304 about the leg pivot axis. As the right and left shoulders 302, 304 are fixed to the top of the right and left legs, the pivoting of the shoulders 302, 304 directly translates into angular rotation of the legs with respect to the housing such that the legs are moved between the bipod mode 102 and the tripod mode 104.

The right foot 116 is moved relative to the right leg between the bipod mode 102 and the tripod mode 104 by actuating a right foot linkage 400. The right foot linkage 400 includes a first crank arm 402, a connector arm 404, a second crank arm 406, and a lever arm 408. The first crank arm 402 is positioned on the inside of the right shoulder 302 and is pivotable about the leg pivot axis. The second crank arm 406 is positioned on the outside of the right shoulder 302 and is also pivotable about the leg pivot axis. The connector arm 404 extends through the right shoulder 302 along the leg pivot axis and is freely rotatable with respect to the shoulder 302. The connector arm 404 couples the first crank arm 402 to the second crank arm 406 such that rotational movement of the first crank arm 402 is transferred to rotational movement of the second crank arm 406. The lever arm 408 extends between the second crank arm 406 and the right foot 116, and is connected to the second crank arm 406 at a pivot point 410 and connected to the right foot 116 at a pivot point (not shown—within the right foot housing). The right foot pivot point is offset from a right foot pivot axis (not shown) such that the right foot 116 may pivot relative to the right leg upon actuation from the lever arm 408.

The right foot linkage 400 is actuated by the right foot follower 224 which is connected to the first crank arm 402 at the link arm 226. Upon rotation of the right cam 202, the right foot follower 224 is linearly displaced by the follower pin sliding through the right foot cam profile. The displacement of the follower 224 induces rotational movement of the first crank arm 402 about the leg pivot axis. The rotational movement of the first crank arm 402 is transferred to the second crank arm 406 through the connector arm 404 and the rotational movement of the second crank arm 406 then moves the lever arm 408. Displacement of the lever arm 408 by the second crank arm 406 translates into the right foot 116 pivoting about the right foot pivot axis because the lever arm 408 is connected at a pivot point offset of the right foot pivot axis. The right foot linkage 400 is actuated substantially simultaneously with the shoulder assembly 300 so that as the right leg pivots with respect to the housing, the right foot 116 pivots about the right foot pivot axis with respect to the right leg so that the right foot 116 remains on the surface S and an ankle is formed at the right leg end.

The left foot 120 is moved relative to the left leg between the bipod mode 102 and the tripod mode 104 by actuating a left foot linkage 412. The left foot linkage 412, similar to the right foot linkage 400, includes a first crank arm 414, a connector arm 416, a second crank arm 418, and a lever arm 420. The first crank arm 414 is positioned on the inside of the left shoulder 304 and the second crank arm 418 is positioned on the outside of the left shoulder 304. The lever arm 420 extends between the second crank arm and the left foot 120, and is connected to the second crank arm 418 at a pivot point (not shown) and connected to the left foot 120 at a pivot point 422. The pivot point 422 is offset from a left foot pivot axis 424 that is defined at a projection 426 within the left foot 120 such that the left foot 120 may pivot relative to the left leg upon actuation from the lever arm 420. The left foot 120 is freely rotatable about the pivot axis 424. In the example, the right foot pivot axis aligns to the left foot pivot axis align because of the similar length of the right and left legs.

The left foot linkage 412 is actuated by the left foot follower 266 which is connected to the first crank arm 414 at the link arm 268. Upon rotation of the left cam 204, the left foot follower 266 is linearly displaced by the follower pin sliding through the left foot cam profile. The displacement of the follower 266 induces rotational movement of the first crank arm 414 about the leg pivot axis. The rotational movement of the first crank arm 414 is transferred to the second crank arm 418 through the connector arm 416 and the rotational movement of the second crank arm 418 then moves the lever arm 420. However, since the lever arm 420 is connected by pivot points at both ends, displacement of the lever arm 420 by the second crank arm 418 translates into the left foot 120 pivoting about the left foot pivot axis 424. Because the left foot linkage 412 is actuated substantially simultaneously with the shoulder assembly 300, as the left leg pivots with respect to the housing, the left foot 120 pivots about the left foot pivot axis 424 with respect to the left leg so that the left foot 120 remains on the surface S and an ankle is formed at the right leg end. The right and left feet linkage 400, 412 have similar component operation but are mirrored about the robotic apparatus, and accordingly, the right and left feet pivot axis are the same.

The mid-leg 114 is extended out of and retracted into the lower section of the housing between the bipod mode 102 and the tripod mode 104 by actuating a mid-leg linkage 500. In the example, the mid-leg linkage 500 includes a first arm 502, a second arm 504, and a third arm 506. The mid-leg 114 is positioned between the right 202 and left cams 204, and the first arm 502 is pivotably connected to the housing at a pivot extension 520. Additionally, the first arm 502 is connected to the mid-leg follower 254 at a connection point 508. At an opposite end, the first arm 502 is also connected to the second arm 504 at a connection point 510. The second arm 504 extends between the first arm 502 and the third arm 506 and is connected to the third arm 506 at a connection point 512. The connections enable the arms 502, 504, 506 to pivot with respect to one another so that the mid-leg linkage 500 can fold up within the housing when the mid-leg 114 is retracted in the bipod mode 102. The third arm 506 forms the mid-leg end 126 and supports the mid-foot 124. The mid-foot 124 is pivotably connected to the third arm 506 at a pivot point 514 that defines a mid-foot pivot axis 516 such that the mid-foot 124 may pivot relative to the mid-leg 114. The mid-leg 114 is described further below in reference to FIG. 7.

The mid-leg linkage 500 is actuated by the mid-leg follower 254 which is connected to the first arm 502 at the link arm 256. Upon rotation of the left cam 204, the mid-leg follower 254 is linearly displaced by the follower pin sliding through the mid-leg cam profile. The displacement of the follower 254 induces rotational movement of the first arm 502 because the connection point 508 is offset from the pivot extension 520 of the first arm 502 which is pivotally connected to the housing. The rotational movement of the first arm 502 linearly extends/retracts the mid-foot 124 from the housing. However, the displacement of the follower 254 is less the amount of travel required to extend/retract the mid-foot 124, thus, rotational movement of the first arm 502 and the pivotably connected second arm 504 multiplies the follower 254 movement so that the mid-foot 124 may reach the surface S. In the example, the linkage 500 can extend to a length that is greater than the distance to the surface S, however, the housing restricts the linkage 500 from extending to its full length so as to generate a retraction restriction force as described further below in reference to FIG. 7. Because the mid-leg linkage 500 is actuated substantially simultaneously with the right and left foot linkage 400, 412 and the shoulder assembly 300, as the right and left legs pivot with respect to the housing and the right and left feet 116, 120 pivot with respect to the legs, the mid-foot 124 extends/retracts from the housing so that the robotic apparatus moves in a fluid and coordinated motion between the bipod mode 102 and the tripod mode 104.

Figure 4E:
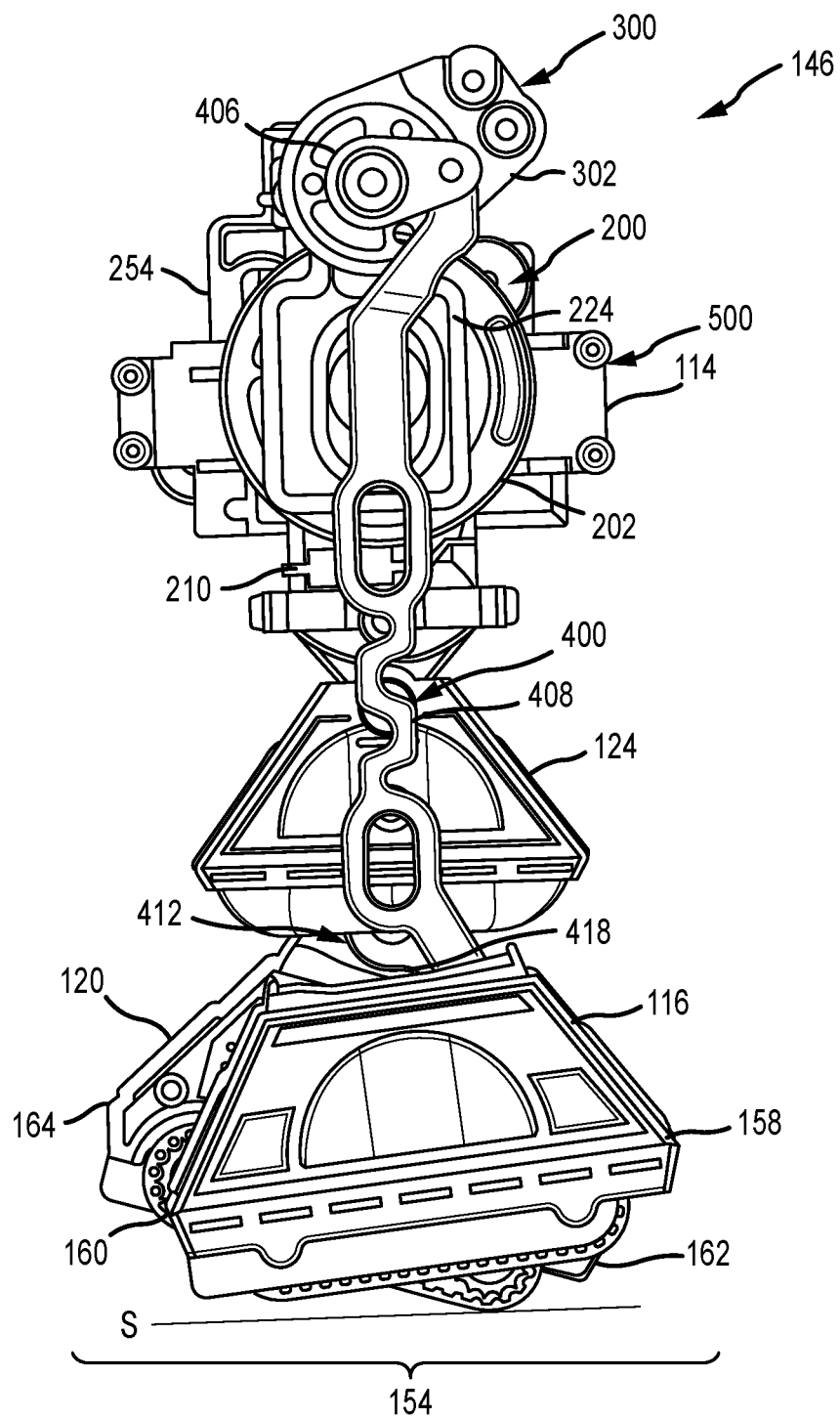
FIGS. 4E and 4F are side views of the transmission system of FIGS. 4A and 4B in a shuffling mode.
Figure 4F:
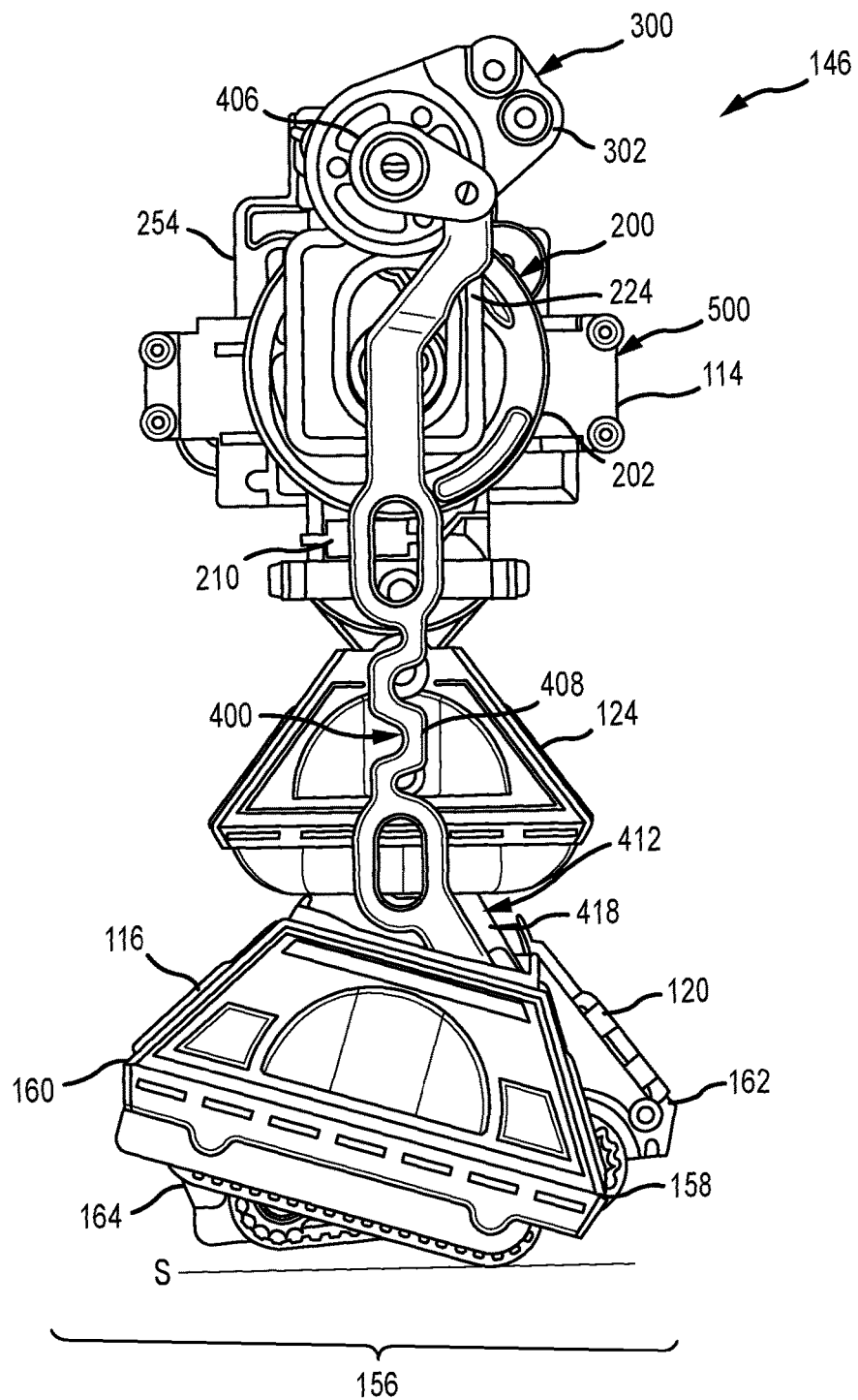

FIGS. 4E and 4F are side views of the transmission system 146 (shown in FIGS. 4A-4D) in a shuffling mode 154, 156 respectively. The shuffling modes 154, 156 enable the right and left feet 116, 120 to be actuated while the robotic apparatus remains in the bipod mode. More specifically, the right and left followers are displaced upon rotation of the cam system 200 while the shoulder follower and the mid-leg follower remain stationary so that the right, left, and mid-legs do not move. FIG. 4E illustrates a right foot shuffle mode 154 wherein the right foot linkage 400 is actuated in an upward direction and the left foot linkage 412 is actuated in a downward direction. FIG. 4F illustrates a left foot shuffle mode 154 wherein the right foot linkage 400 is actuated in a downward direction and the left foot linkage 412 is actuated in an upward direction. Referring concurrently to FIGS. 4E and 4F, in the shuffling modes 154, 156 the shoulder assembly 300 and mid-leg linkage 500 are positioned in the bipod mode so that the right and left legs are supporting the robotic apparatus and the mid-leg 114 is retracted within the housing.

In the right foot shuffle mode 154, the right foot linkage 400 is actuated by the right foot follower 224. Upon rotation of the right cam 202, the right foot follower 224 is linearly displaced by the follower pin sliding through the right foot cam profile. The displacement of the follower 224 induces rotational movement of the second crank arm 406 that moves the lever arm 408 in an upward direction. By moving the lever arm 408, which is offset of the foot pivot axis, in an upward direction while the robotic apparatus is in the bipod mode, the right foot 116 pivots about the foot pivot axis such that a right heel 158 is raised from the surface S and a right toe 160 is pointed towards the surface S. Concurrently with the actuation of the right foot linkage 400, the left foot linkage 412 is actuated by the left foot follower. Upon rotation of the left cam, the left foot follower is linearly displaced by the follower pin sliding through the left foot cam profile. The displacement of the follower induces rotation movement of the second crank arm that moves the lever arm 418 in a downward direction. By moving the lever arm 418, which is offset of the foot pivot axis, in a downward direction while the robotic apparatus is in the bipod mode, the left foot 120 pivots about the foot pivot axis such that a left heel 162 is depressed into the surface S and a left toe 164 is raised from the surface S. In an alternative example, the left foot linkage 412 may not be actuated so that the right foot linkage 400 is only actuated and the right heel 158 is raised from the surface S in the right foot shuffle mode 154.

In the left foot shuffle mode 156, the movement directions of the right and left foot linkages 400, 412 are reversed. For example, upon rotation of the right cam 202, the right foot follower 224 is linearly displaced by the follower pin sliding through the right foot cam profile. The displacement of the follower 224 induces rotational movement of the second crank arm 406 that moves the lever arm 408 in a downward direction. By moving the lever arm 408, which is offset of the foot pivot axis, in a downward direction while the robotic apparatus is in the bipod mode, the right foot 116 pivots about the foot pivot axis such that the right heel 158 is depressed into the surface S and the right toe 160 is raised therefrom. Concurrently with the actuation of the right foot linkage 400, upon rotation of the left cam, the left foot follower is linearly displaced by the follower pin sliding through the left foot cam profile. The displacement of the follower induces rotation movement of the second crank arm that moves the lever arm 418 in an upward direction. By moving the lever arm 418, which is offset of the foot pivot axis, in an upward direction while the robotic apparatus is in the bipod mode, the left foot 120 pivots about the foot pivot axis such that the left heel 162 is raised from the surface S and the left toe 164 is pointed towards the surface S. In an alternative example, the right foot linkage 400 may not be actuated so that the left foot linkage 412 is only actuated and the left heel 162 is raised from the surface S in the left foot shuffle mode 156. By actuating the right and left foot linkages 400, 412 in opposite directions the right and left feet 116, 120 are pivoted off-cycle from one another so that the robotic apparatus moves in a shuffling or waddling motion while in the bipod mode. In the example, the cam system 200 may rotate back and forth so as to maintain the shuffling or waddling motion.

Figure 5B:
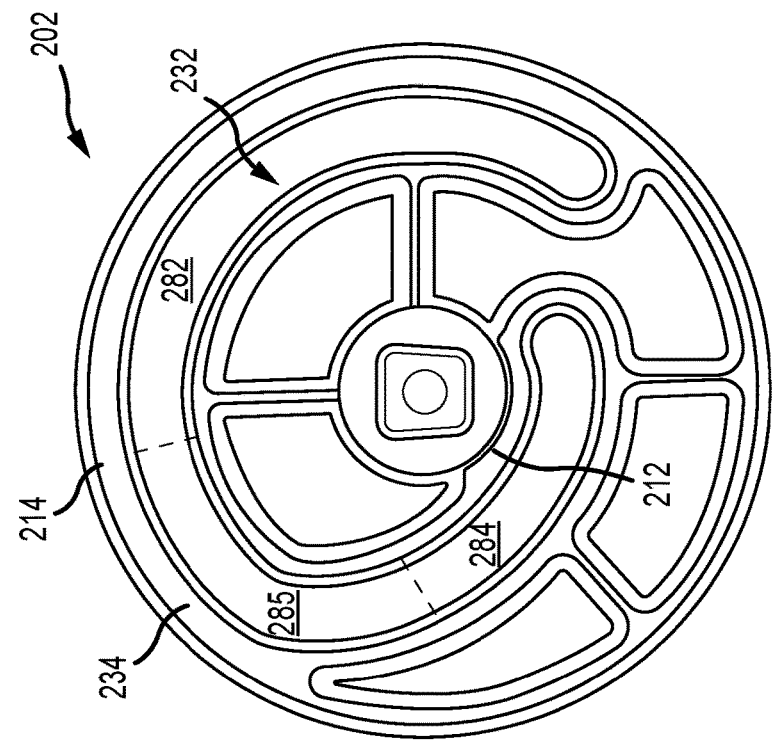
FIGS. 5A and 5B are opposite side views of a right cam of the cam system of FIG. 3.
Figure 5A:
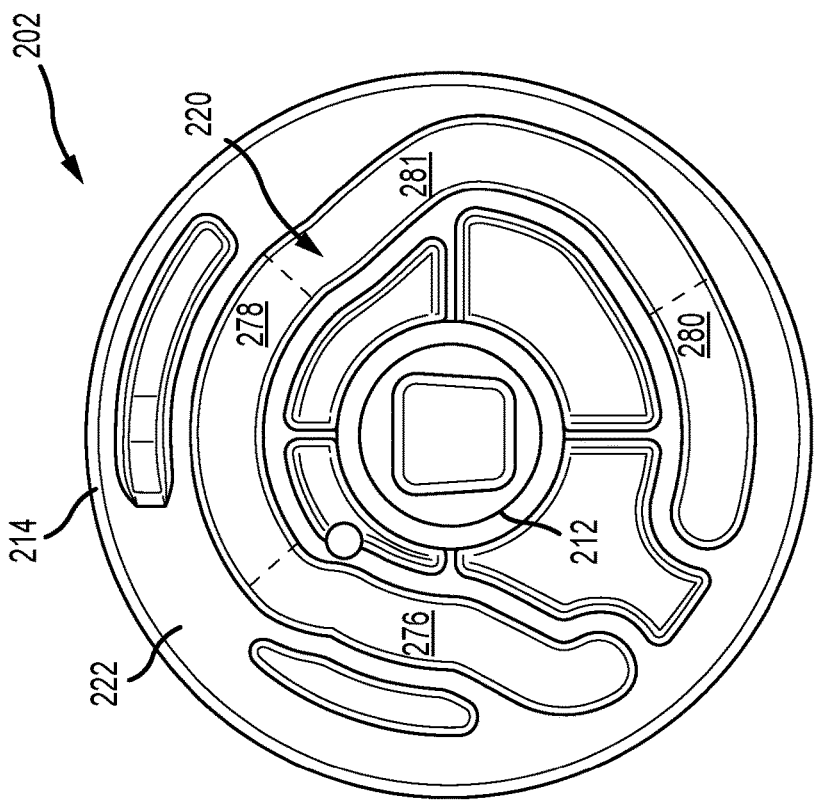

FIGS. 5A and 5B are opposite side views of the right cam 202 of the cam system 200 (shown in FIG. 3). FIG. 5A is a side view of the right foot cam profile 220 formed on the first side 222 of the right cam 202. The profile 220 is a recessed track defined within the disk 214 and is shaped to transfer rotational movement of the right cam 202 into linear movement of the right foot follower, which in turn actuates the right foot. The profile 220 has four zones that correspond to the right foot position in each of the bipod mode, tripod mode, and shuffling mode. A first zone 276 positions the right foot follower so that the right foot is positioned in the foot shuffling modes 154, 156 (shown in FIGS. 4E and 4F). A second zone 278 positions the right foot follower so that the right foot is positioned in the bipod mode 102 (shown in FIGS. 4A and 4C). A third zone 280 positions the right foot follower so that the right foot is positioned in the tripod mode 104 (shown in FIGS. 4B and 4D). A fourth transition zone 281 is positioned between the second zone 278 and the third zone 280 and induces the right foot movement between the bipod mode and the tripod mode. The follower pin of the right foot follower rides in the track and upon rotation of the right cam 202, the profile 220 is sized and shaped to translate the rotational movement of the cam 202 into linear movement of the follower so as to pivot the right foot. The right foot follower moves only linearly because the follower is mounted around the shaft 212 in the elongated opening and the housing restricts rotation of the follower.

FIG. 5B is a side view of the shoulder cam profile 232 formed on the second side 234 of the right cam 202. The profile 232 is a recessed track defined within the disk 214 and is shaped to transfer rotational movement of the right cam 202 into linear movement of the shoulder follower, which in turn actuates the right and left legs. The profile 232 has three zones that correspond to the right and left leg positions in the bipod mode and tripod mode. A first zone 282 positions the shoulder follower so that the right and left legs are positioned in the bipod mode 102 (shown in FIGS. 4A and 4C). A second zone 284 positions the shoulder follower so that the right and left legs are positioned in the tripod mode 104 (shown in FIGS. 4B and 4D). The first zone 282 has a longer length then the second zone 284 because during the shuffling mode the right and left legs maintain the bipod mode position. A third transition zone 285 is positioned between the first zone 282 and the second zone 284 and induces the right and left leg movement between the bipod mode and the tripod mode. The follower pin of the shoulder follower rides in the track and upon rotation of the right cam 202, the profile 232 is sized and shaped to translate the rotational movement of the cam 202 into linear movement of the follower so as to pivot the right and left legs. The shoulder follower moves only linearly because the follower is mounted around the shaft 212 in the elongated opening and the housing restricts rotation of the follower.

FIGS. 6A and 6B are opposite side views of the left cam 204 of the cam system 200 (shown in FIG. 3). FIG. 6A is a side view of the left foot cam profile 262 formed on the second side 264 of the left cam 204. The profile 262 is a recessed track defined within the disk 218 and is shaped to transfer rotational movement of the left cam 204 into linear movement of the left foot follower, which in turn actuates the left foot. The profile 262 has four zones that correspond to the left foot position in each of the bipod mode, tripod mode, and shuffling mode. A first zone 286 positions the left foot follower so that the left foot is positioned in the foot shuffling modes 154, 156 (shown in FIGS. 4E and 4F). A second zone 288 positions the left foot follower so that the left foot is positioned in the bipod mode 102 (shown in FIGS. 4A and 4C). A third zone 290 positions the left foot follower so that the left foot is positioned in the tripod mode 104 (shown in FIGS. 4B and 4D). A fourth transition zone 291 is positioned between the second zone 288 and the third zone 290 and induces the left foot movement between the bipod mode and the tripod mode. The follower pin of the left foot follower rides in the track and upon rotation of the left cam 204, the profile 262 is sized and shaped to translate the rotational movement of the cam 204 into linear movement of the follower so as to pivot the left foot. The left foot follower moves only linearly because the follower is mounted around the shaft 216 in the elongated opening and the housing restricts rotation of the follower.

FIG. 6B is a side view of the mid-leg cam profile 250 formed on the first side 252 of the left cam 204. The profile 250 is a recessed track defined within the disk 218 and is shaped to transfer rotational movement of the left cam 204 into linear movement of the mid-leg follower, which in turn actuates the mid-leg. The profile 250 has three zones that correspond to the mid position in the bipod mode and tripod mode. A first zone 292 positions the mid-leg follower so that the mid-leg is positioned in the bipod mode 102 (shown in FIGS. 4A and 4C). A second zone 294 positions the mid-leg follower so that the mid-leg is positioned in the tripod mode 104 (shown in FIGS. 4B and 4D). The first zone 292 has a longer length then the second zone 294 because during the shuffling mode the mid-leg remains retracted in the bipod mode position. A third transition zone 295 is positioned between the first zone 292 and the second zone 294 and induces the mid-leg movement between the bipod mode and the tripod mode. The follower pin of the mid-leg follower rides in the track and upon rotation of the left cam 204, the profile 250 is sized and shaped to translate the rotational movement of the cam 204 into linear movement of the follower so as to extend/retract the mid-leg. The mid-leg follower moves only linearly because the follower is mounted around the shaft 212 in the elongated opening and the housing restricts rotation of the follower.

Additionally, when comparing the right foot cam profile 220 to the left foot cam profile 262, the second and third zones are similarly shaped so that the right and left feet move together between the bipod mode and the tripod mode. However, the first zones are not similarly shaped because the right and left feet move off-cycle from one another as described above with respect to the shuffling modes.

Figure 7:
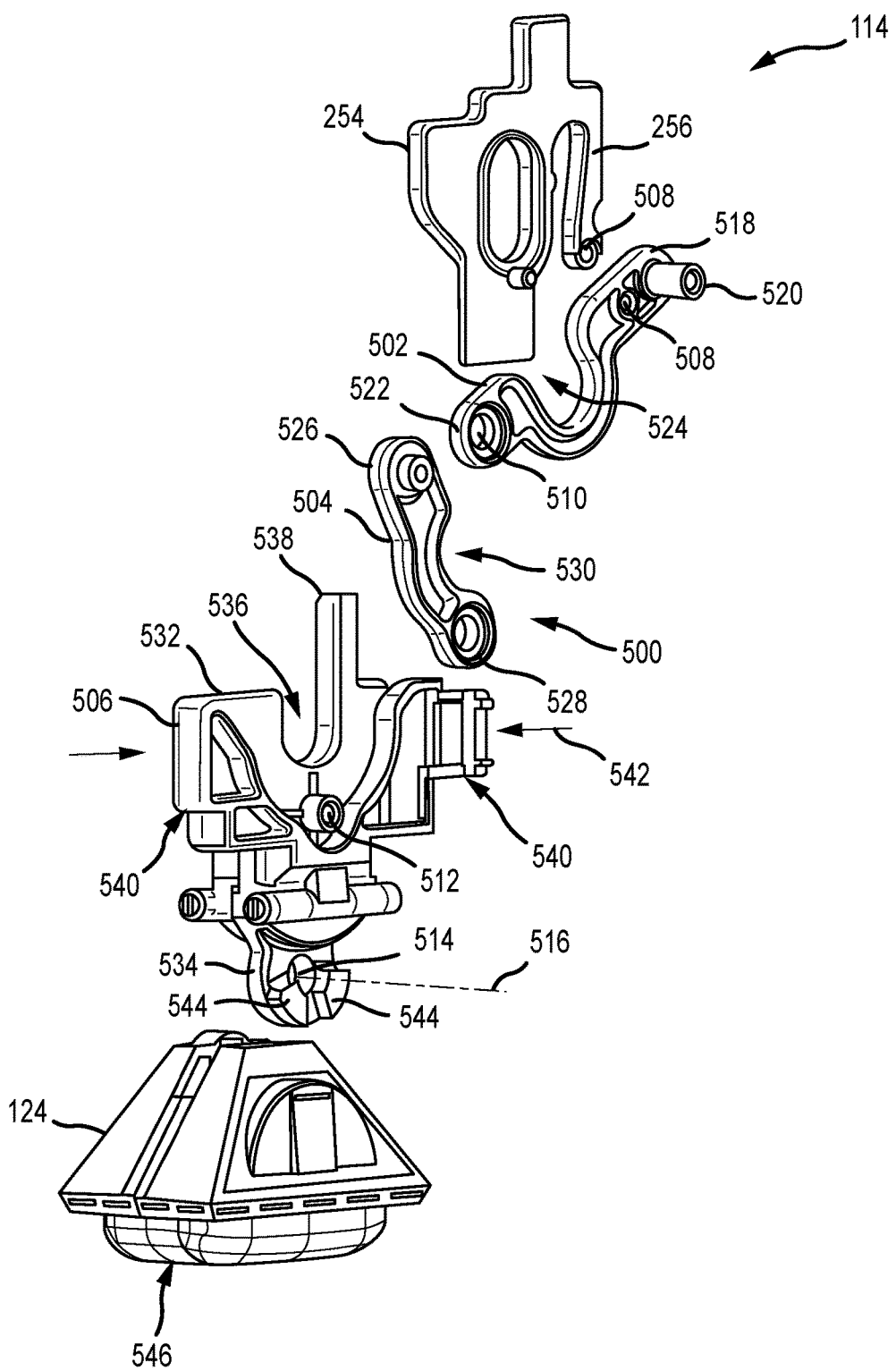
FIG. 7 is an exploded perspective view of a mid-leg of the robotic apparatus.

FIG. 7 is an exploded perspective view of the mid-leg 114 of the robotic apparatus. The mid-leg 114 includes the mid-leg linkage 500 and the mid-foot 124. The mid-leg linkage 500 includes the first arm 502, the second arm 504, and the third arm 506 that are all pivotably connected together such that the mid-leg 114 can extend/retract from the housing. The mid-leg linkage 500 extends between the mid-leg follower 254 and the mid-foot 124. The mid-leg follower 254 includes the link arm 256 that connects to the first arm 502 at the connection point 508. The connection point 508 on the first arm 502 is offset from a first end 518 of the arm 502. A pivot extension 520 extends from the first end 518 of the first arm 502. The pivot extension 520 is pivotably connected to the housing at a fixed position such that the first arm 502 can pivot with respect to the housing. Because the link arm 256 is connected to the first arm 502 at an offset position from the first end 518, the linear displacement of the mid-leg follower 254 induces rotation of the first arm 502 in relation to the housing. A second end 522 of the first arm 502 is pivotably connected to the second arm 504. A recess 524 is formed between the first end 518 and the second end 522, such that when the mid-leg 114 is retracted within the housing, the first arm 502 does not interfere with the cam shaft.

The second arm 504 includes a first end 526 and a second end 528. The first end 526 pivotably connects to the first arm 502 at the connection point 510 and the second end 528 pivotably connects to the third arm 506 at the connection point 512 such that the second arm 504 extends between the first arm 502 and the third arm 506 and may pivot relative to each in the mid-leg linkage 500. A recess 530 is formed between the first end 526 and the second end 528, such that when the mid-leg 114 is retracted within the housing, the second arm 504 does not interfere with the cam shaft. The third arm 506 also includes a first end 532 and a second end 534. The first end 532 includes a recess 536, such that when the mid-leg 114 is retracted within the housing, the third arm 506 does not interfere with the cam shaft.

The first end 532 also includes a lockout extension portion 538 that is configured to engage with the extension 246 of the lockout mechanism 210 (shown in FIG. 3) so that when the mid-leg 114 is extended out of the housing the mid-leg linkage 500 is prevented from folding back into the housing. Additionally, the third arm 506 includes at least one stop surface 540 that is configured to engage with the stop 148 of the housing 106 (shown in FIG. 2B) so that when the mid-leg 114 is extended out of the housing, the mid-leg linkage 500 does not extend its full length and is engaged with the housing with a predetermined retraction restriction force that prevents the mid-leg linkage 500 from folding back into the housing. Because the displacement of the mid-leg follower 254 by the cam system is multiplied by mid-leg linkage 500 so as to extend/retract the mid-leg 114 from the housing, the joints in the linkage 500 generally need to be tight to prevent the mid-leg 114 from folding back into the housing. However, the lockout mechanism and the housing stops are included in the robotic apparatus so that the required tightness of the mid-leg linkage 500 is reduced while still preventing the mid-leg 114 from folding back into the housing.

The third arm 506 has a width 542 that extends substantially the entire interior cavity of the housing so that the third arm 506 is configured to move linearly in an up and down direction within the housing without rocking back and forth and/or rotating. This enables the mid-foot 124 to have a linear movement when extending/retracting from the housing. The second end 534 of the third arm 506 pivotably connects to the mid-foot 124 at the pivot point 514. As such, the mid-foot 124 may freely pivot relative to the mid-leg 114 about the mid-foot pivot axis 516 to enable the robotic apparatus to move over many different types of surfaces S and absorb terrain features. In the example, the second end 534 includes foot stops 544 so as to limit the amount that the mid-foot 124 may pivot about the mid-foot pivot axis 516 and prevent over rotation. For example, this limited motion ensures that the mid-foot 124 will always be extended to the surface S with a bottom surface 546 contacting first. In alternative examples, a torsion spring may be included to facilitate controlling the pivot angle of the mid-foot 124. The bottom surface 546 may be a replaceable lubricated plastic skid that slides over the surface S when the robotic apparatus is being driven. In other examples, the mid-foot 124 may include a wheel or tread that rolls over the surface S as the robotic apparatus is being driven therealong.

Figure 8:
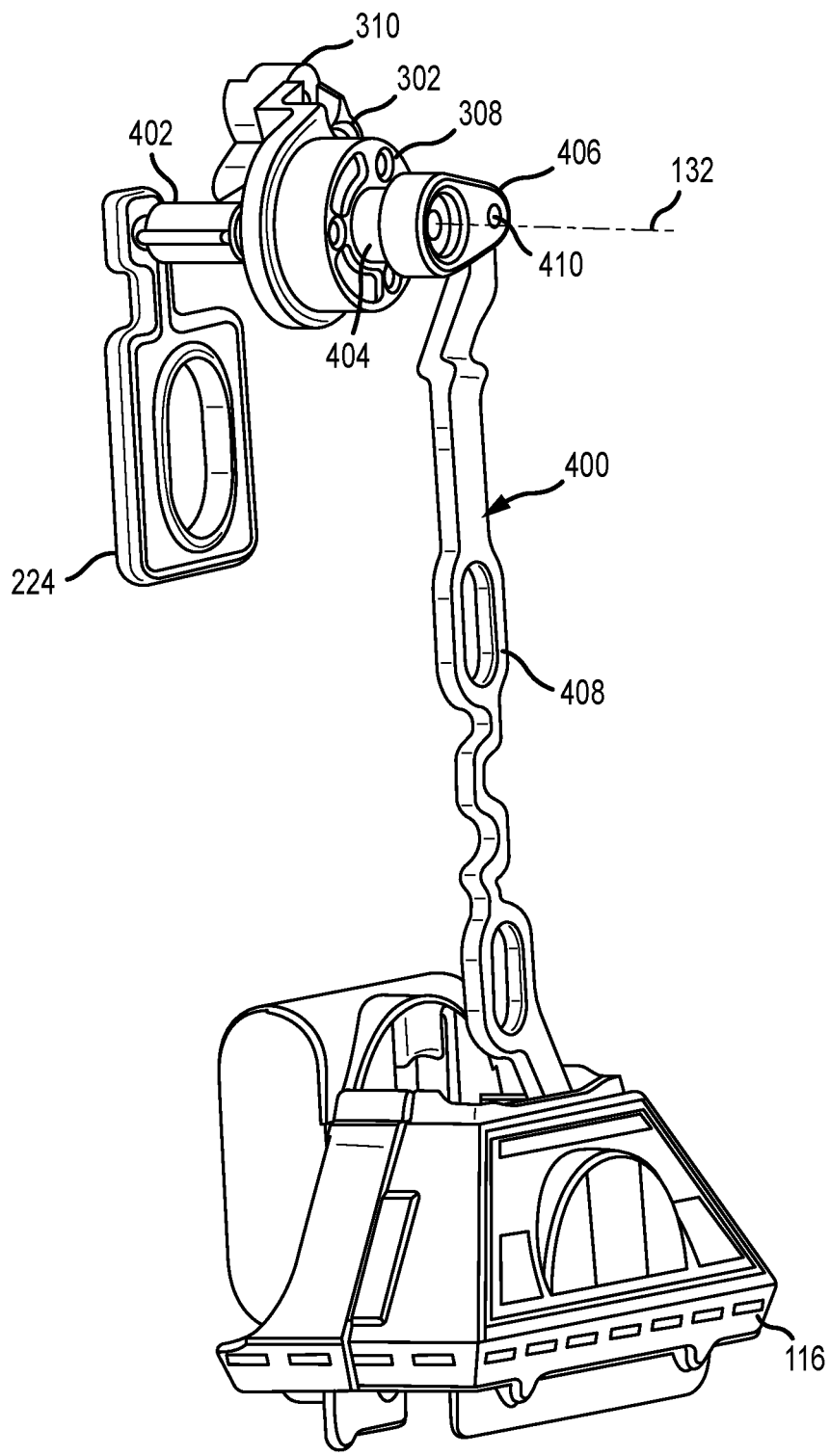
FIG. 8 is a perspective view of a right shoulder and a right foot linkage of the robotic apparatus.

FIG. 8 is a perspective view of a right shoulder 302 and a right foot linkage 400 of the robotic apparatus. The right shoulder 302 has a cylindrical portion 308 and a cross-bar extension 310. The cylindrical portion 308 is journaled within the housing and is fixed to the right leg such that the right shoulder 302 can pivot the right leg between the bipod mode and the tripod mode about the leg pivot axis 132. The cross-bar extension 310 receives the cross-bar of the shoulder assembly so that the right shoulder 302 is coupled to the left shoulder and can be moved together. The cross-bar extension 310 offsets the cross-bar of the shoulder assembly so that the cam system may be disposed underneath and conserve space within the housing. Additionally, the cross-bar is offset from the leg pivot axis 132 so that the connector 404 can be concentric with the leg pivot axis 132. Along the leg pivot axis 132, the connector arm 404 extends through the right shoulder 302 so that the connector arm 404 can pivot independently from the right shoulder 302.

The right foot linkage 400 extends between the right foot follower 224 and the right foot 116. The first crank arm 402 is coupled to the right foot follower 224 and is positioned on the inside of the right shoulder 302. The first crank arm 402 translates linear displacement of the right foot follower 224 into the pivoting movement of the right foot 116 as described above. The first crank arm 402 is connected to the connector arm 404 which is connected to the second crank arm 406 positioned on the outside of the right shoulder 302. The second crank arm 406 rotates upon actuation of the first crank arm 402 and moves the lever arm 408 about the pivot point 410 so that the right foot 116 may pivot relative to the right leg. The second crank arm 406 and the lever arm 408 are disposed within and move relative to the right leg and thus are not visible on the robotic apparatus.

The right foot 116 is formed as a housing which includes a movement system disposed therein so that the right and left feet may drive the robotic apparatus along the surface S. The movement system is described further below. Additionally, FIG. 8 illustrates the right shoulder 302 and the right foot linkage 400, it is appreciated that the left shoulder and the left foot linkage are configured in a similar manner but mirrored on the opposite side of the robotic apparatus.

Figure 9A:
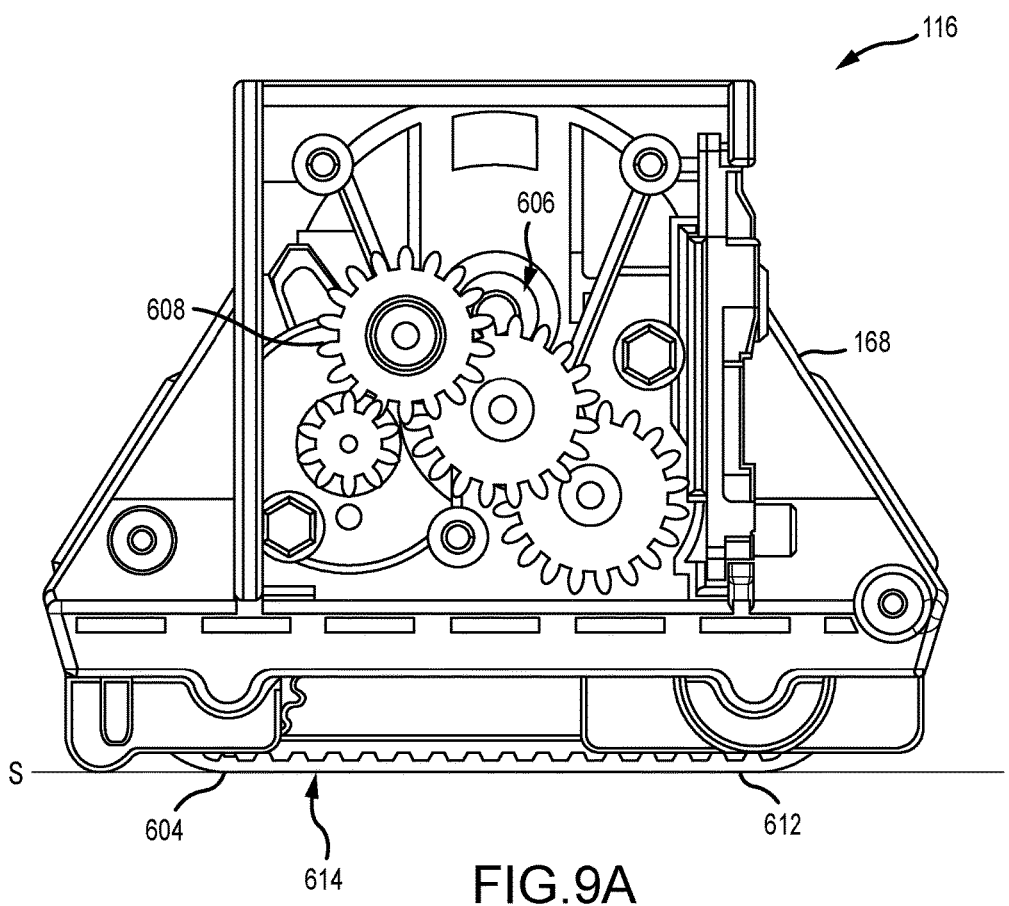
FIG. 9A is a side view of a right foot of the robotic apparatus.
Figure 9B:
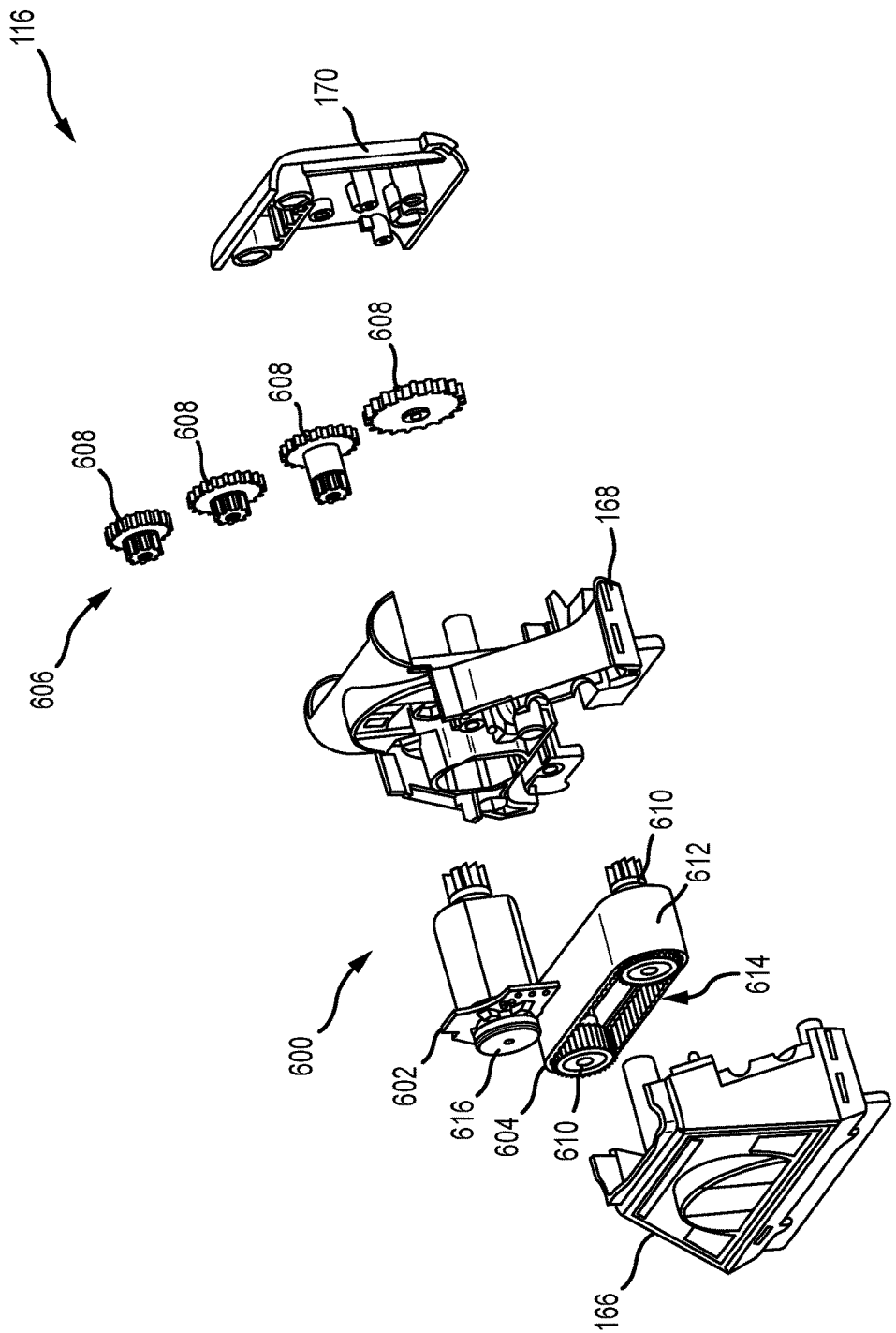
FIG. 9B is an exploded perspective view of the right foot of FIG. 9A.

FIG. 9A is a side view of the right foot 116 of the robotic apparatus. FIG. 9B is an exploded perspective view of the right foot 116. Referring concurrently to FIGS. 9A and 9B, the right foot 116 includes a movement system 600 so that the robotic apparatus may drive along the surface S. The foot 116 includes three housing pieces 166, 168, 170 that house the movement system 600. The housing pieces 166, 168, 170 may be screwed, snap-fit, or coupled together in any other way as required or desired. The movement system 600 includes an electric drive motor 602 coupled to a belt drive 604 through a gearbox 606. The gearbox 606 is disposed between the second housing piece 168 and the third housing piece 170 and is independently sealed from the motor 602 and the belt drive 604 to reduce dirt and debris accumulation. The gearbox 606 includes a plurality of gears 608 that transfer rotational movement of the motor 602 to rotational movement of the belt drive 604 and that are configured to reduce the motor 602 speed but increase the torque applied to the belt drive 604. One or more of the gears 608 may extend out of the gearbox 606 so as to couple to the motor 602 and/or belt drive 604.

The motor 602 and the belt drive 604 are disposed between the first housing piece 166 and the second housing piece 168 and separate from the gearbox 606 expect for the gears 608 extending thereto. The belt drive 604 includes two spaced apart rollers 610 with a track 612 that surrounds both rollers 610 such that upon rotation by the motor 602, the track 612 can drive the robotic apparatus along the surface S in a forward or rearward direction. The track 612 forms a ground engaging surface 614 that engages with the surface S and propels the robotic apparatus in the forward or rearward direction. Because the right foot 116 pivots with respect to the right leg, the ground engaging surface 614 remains substantially parallel to the surface S when the robotic apparatus in in the bipod mode and the tripod mode. The width of the track 612 also increases the robotic apparatus' ability to drive over carpet and pebbled surfaces without losing grip on the surface S. In alternative examples, the motor may drive one or more wheels such that the robotic apparatus may drive along the surface.

FIGS. 9A and 9B illustrate the right foot 116, it is appreciated that the left foot is configured in a similar manner but mirrored on the opposite side of the robotic apparatus. Additionally, both the right and left feet are independently operable such that the feet can drive in different speeds or directions for rotating, turning, pivoting, etc. the robotic apparatus. Moreover, if one foot slips power can be transferred to the other foot such that the robotic apparatus may drive over slippery surfaces. As such, an encoder 616 is communicatively coupled to the motor 602 to measure and control speed, power, etc.

Figure 10:
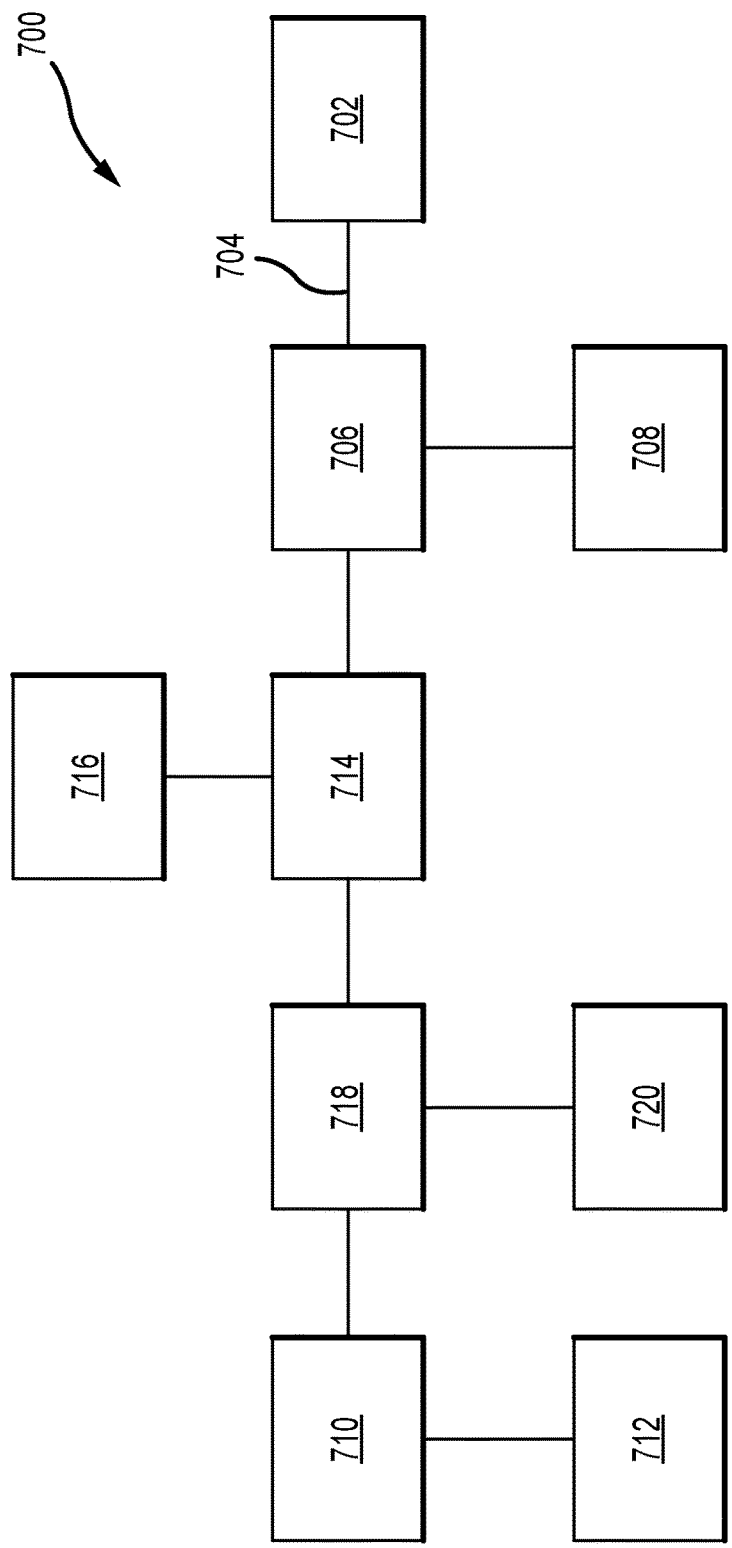
FIG. 10 is a schematic view of another transmission system of the robotic apparatus.

FIG. 10 is a schematic view of another transmission system 700 of the robotic apparatus. In this example, instead of a cam system, a motor 702 drives a plurality of gears which move the right, left, and mid-legs between the bipod mode and the tripod mode. For example, the motor 702 drives a shaft 704. A right foot gear reduction 706 is coupled to and driven by the shaft 704 so as to pivot a right foot 708. A left foot gear reduction 710 is coupled to and driven by the shaft 704 so as to pivot a left foot 712. A shoulder gear reduction 714 is coupled to and driven by the shaft 704 so as to pivot a shoulder 716. A mid-leg gear reduction 718 is coupled to and driven by the shaft 704 so as to extend/retract a mid-leg 720. Through use of the transmission system 700 movement of the right and left feet, the right and left legs, and the mid-leg is directly driven through the rotation of the shaft 704.

Figure 11:
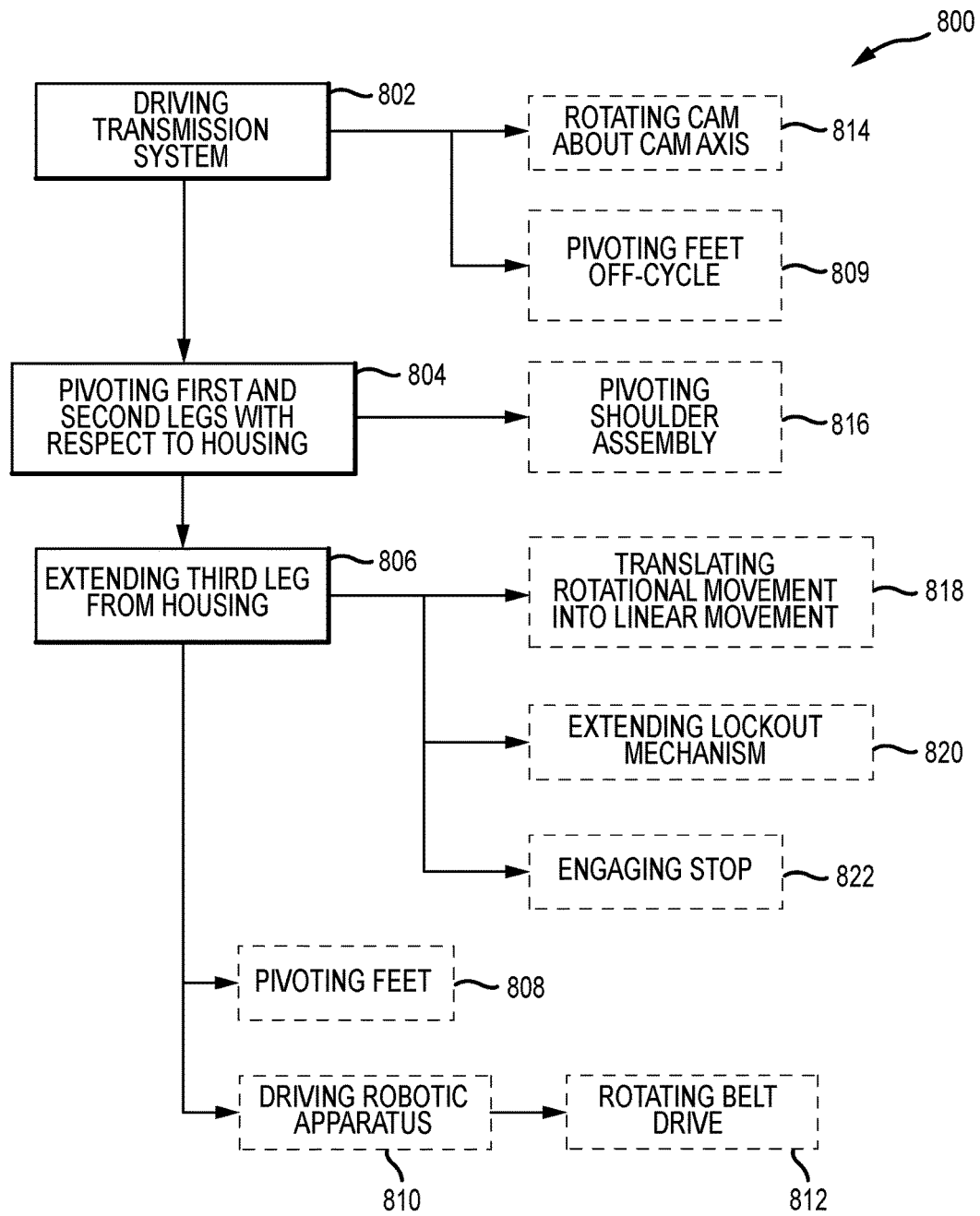
FIG. 11 is a flowchart of a method of moving a robotic apparatus from a bipod mode to a tripod mode.

FIG. 11 is a flowchart of a method 800 of moving a robotic apparatus from a bipod mode to a tripod mode. The robotic apparatus includes a housing, a first leg and a second leg extending from the housing, and a retractable third leg positioned between the first leg and the second leg. The method 800 includes driving a transmission system by a motor (operation 802) and pivoting the first leg and the second leg with respect to the housing via the transmission system (operation 804). Additionally, the third leg extends from the housing via the transmission system (operation 806). In the bipod mode the first leg and the second leg support the housing and the third leg is at least partially retracted into the housing, and in the tripod mode the first leg, the second leg, and the third leg support the housing and the third leg is extended at least partially out of the housing.

The robotic apparatus may further include a first foot disposed at an end of the first leg and a second foot disposed at an end of the second leg such that the method 800 further includes pivoting the first foot relative to the first leg and pivoting the second foot relative to the second leg (operation 808). In some examples, the method 800 may further include pivoting the first foot off-cycle from the second foot while in the bipod mode so that the shuffling mode is induced (operation 809). In other examples, the method 800 further includes driving the robotic apparatus along a surface via the first foot and the second foot (operation 810). The first foot and the second foot each can include a drive motor and a belt drive, such that driving the robotic apparatus includes rotating the belt drive via the drive motor (operation 812)

The transmission system may include a cam system having at least one cam such that driving the transmission system includes rotating the at least one cam about a cam axis (operation 814). The robotic apparatus may also include a shoulder assembly coupled between the cam system and the first leg and the second leg such that pivoting the first leg and the second leg includes pivoting the shoulder assembly about a leg pivot axis via the at least one cam (operation 816). The third leg may include a linkage coupled to the cam system such that extending the third leg includes translating rotational movement of the at least one cam into linear movement of the third leg via the linkage (operation 818).

The robotic apparatus may further include a lockout mechanism coupled to the cam system such that extending the third leg includes extending the lockout mechanism such that the third leg is prevent from retracting into the housing when the robotic apparatus is in the tripod mode (operation 820). The housing may include a stop such that extending the third leg includes engaging, with a predetermined force, the stop with a portion of the third leg (operation 822).

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A robotic apparatus moveable between a bipod mode and a tripod mode, the apparatus comprising:
   a housing;
   a first leg and a second leg extending from the housing;
   a retractable third leg positioned between the first leg and the second leg, wherein the third leg is configured to extend from the housing in the tripod mode and retract at least partially into the housing in the bipod mode;
   a motor disposed within the housing; and
   a transmission system coupled between the motor and at least one of the first leg, the second leg, and the third leg, wherein the transmission system is configured to move the robotic apparatus between the bipod mode where the first leg and the second leg support the housing and the tripod mode where the first leg, the second leg, and the third leg support the housing.

2. The robotic apparatus of claim 1, wherein the first leg and the second leg pivot relative to the housing when the robotic apparatus moves from the bipod mode to the tripod mode.

3. The robotic apparatus of claim 1, wherein when the robotic apparatus moves from the bipod mode to the tripod mode, the third leg extends from the housing.

4. The robotic apparatus of claim 1 further comprising:
   a first foot disposed at an end of the first leg, wherein the first foot is pivotable relative to the first leg; and
   a second foot disposed at an end of the second leg, wherein the second foot is pivotable relative to the second leg.

5. The robotic apparatus of claim 4, wherein the first foot is configured to pivot off-cycle from the second foot.

6. The robotic apparatus of claim 4, wherein when the robotic apparatus moves between the bipod mode and the tripod mode, the first foot and the second foot substantially simultaneously pivot relative to the first leg and the second leg respectively.

7. The robotic apparatus of claim 4, wherein the first foot and the second foot are configured to drive the robotic apparatus along a surface.

8. The robotic apparatus of claim 4, wherein the transmission system comprises a cam system, wherein the cam system is configured to move the first leg, the second leg, and the third leg relative to the housing.

9. The robotic apparatus of claim 8, wherein the cam system comprises at least one cam rotatable about a cam axis.

10. The robotic apparatus of claim 9 further comprising a shoulder assembly extending between the first leg and the second leg, wherein the cam system is coupled to the shoulder assembly, and wherein the cam system comprises a profile configured to pivot the shoulder assembly about a leg pivot axis such that the first leg and the second leg pivot relative to the housing.

11. The robotic apparatus of claim 10, wherein the leg pivot axis and the cam axis are offset.

12. The robotic apparatus of claim 8, wherein the cam system comprises at least one profile configured to pivot the first foot and the second foot relative to the first leg and the second leg respectively.

13. The robotic apparatus of claim 12, wherein the at least one profile is further configured to pivot the first foot off-cycle from the second foot when in the bipod mode.

14. The robotic apparatus of claim 12, wherein the at least one profile is further configured to substantially simultaneously pivot the first foot and the second foot relative to the first leg and the second leg respectively when the first leg and the second leg pivot relative to the housing.

15. The robotic apparatus of claim 8, wherein the cam system comprises a profile configured to actuate the third leg.

16. The robotic apparatus of claim 15, wherein the profile is further configured to substantially simultaneously extend the third leg when the first leg and the second leg pivot relative to the housing.

17. The robotic apparatus of claim 15 further comprising a linkage coupled between the cam system and the third leg, wherein the linkage is configured to translate rotational movement of the cam into linear movement of the third leg.

18. The robotic apparatus of claim 8 further comprising a lockout mechanism, wherein the cam system comprises a profile configured to extend the lockout mechanism, wherein the lockout mechanism is configured to prevent retraction of the third leg into the housing when the robotic apparatus is in the tripod mode.

19. The robotic apparatus of claim 18, wherein the lockout mechanism is disposed within the housing.

20. The robotic apparatus of claim 8, wherein the housing comprises a stop, and wherein the cam system is configured to extend the third leg such that a portion of the third leg engages the stop with a predetermined force.

21. The robotic apparatus of claim 8, wherein the first foot and the second foot each comprise a drive motor and a belt drive, wherein the drive motor is configured to rotate the belt drive to drive the robotic apparatus along a surface.

22. The robotic apparatus of claim 21, wherein the cam system is configured to pivot the first foot and the second foot relative to the first leg and the second leg respectively such that a ground engaging surface of the belt drive is substantially parallel to the surface when the robotic apparatus is in the bipod mode and in the tripod mode.

23. The robotic apparatus of claim 1, wherein the third leg comprises a third foot, the third foot comprising a skid.

24. A method of moving a robotic apparatus from a bipod mode to a tripod mode, the robotic apparatus including a housing, a first leg and a second leg extending from the housing, and a retractable third leg positioned between the first leg and the second leg, the method comprising:
    driving a transmission system by a motor;
    pivoting the first leg and the second leg with respect to the housing via the transmission system; and
    extending the third leg from the housing via the transmission system, wherein in the bipod mode the first leg and the second leg support the housing and the third leg is at least partially retracted into the housing, and wherein in the tripod mode the first leg, the second leg, and the third leg support the housing and the third leg is at least partially extended out of the housing.

25. The method of claim 24, wherein when the first leg and the second leg pivot, the third leg substantially simultaneously extends from the housing when the robotic apparatus moves from the bipod mode to the tripod mode.

26. The method of claim 24, wherein the robotic apparatus further includes a first foot disposed at an end of the first leg and a second foot disposed at an end of the second leg, the method further comprising:
    pivoting the first foot relative to the first leg; and
    pivoting the second foot relative to the second leg.

27. The method of claim 26, wherein when the first leg and the second leg pivots, the first foot and the second foot substantially simultaneously pivot relative to the first leg and the second leg respectively when the robotic apparatus moves from the bipod mode to the tripod mode.

28. The method of claim 26 further comprising driving the robotic apparatus along a surface via the first foot and the second foot.

29. The method of claim 28, wherein the first foot and the second foot each include a drive motor and a belt drive, and wherein driving the robotic apparatus comprises rotating the belt drive via the drive motor.

30. The method of claim 24, wherein the transmission system includes a cam system having at least one cam, and wherein driving the transmission system comprises rotating the at least one cam about a cam axis.

31. The method of claim 30, wherein the robotic apparatus further includes a shoulder assembly coupled between the cam system and the first leg and the second leg, and wherein pivoting the first leg and the second leg comprises pivoting the shoulder assembly about a leg pivot axis via the at least one cam.

32. The method of claim 30, wherein the third leg includes a linkage coupled to the cam system, and wherein extending the third leg comprises translating rotational movement of the at least one cam into linear movement of the third leg via the linkage.

33. The method of claim 30, wherein the robotic apparatus further includes a lockout mechanism coupled to the cam system, and wherein extending the third leg comprises extending the lockout mechanism such that the third leg is prevented from retracting into the housing when the robotic apparatus is in the tripod mode.

34. The method of claim 24, wherein the housing includes a stop, and wherein extending the third leg comprises engaging, with a predetermined force, the stop with a portion of the third leg.

* * * * *